(12) United States Patent
Terada et al.

(10) Patent No.: US 7,428,355 B2
(45) Date of Patent: Sep. 23, 2008

(54) WAVELENGTH SELECTIVE AND LEVEL ADJUSTING OPTICAL DEVICE

(75) Inventors: Koji Terada, Kawasaki (JP); Haruhiko Tabuchi, Kawasaki (JP); Kohei Shibata, Kawasaki (JP); Terukazu Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/752,740

(22) Filed: May 23, 2007

(65) Prior Publication Data

US 2007/0258678 A1 Nov. 8, 2007

Related U.S. Application Data

(62) Division of application No. 11/140,366, filed on May 27, 2005, now Pat. No. 7,239,770.

(51) Int. Cl.
*G02B 6/34* (2006.01)
*G02B 6/26* (2006.01)
*G02B 6/42* (2006.01)

(52) U.S. Cl. .............................. 385/37; 385/15; 385/16; 385/18; 385/31; 385/39; 385/47

(58) Field of Classification Search .................... 385/37
See application file for complete search history.

(56) References Cited

U.S. PATENT DOCUMENTS

| 6,263,123 | B1 * | 7/2001 | Bishop et al. | .............. 385/15 |
| 6,807,372 | B1 * | 10/2004 | Lee et al. | ...................... 398/78 |
| 6,947,633 | B2 | 9/2005 | Singh et al. | |
| 2002/0181849 | A1 * | 12/2002 | Flanders | ...................... 385/18 |

FOREIGN PATENT DOCUMENTS

| JP | 8-46569 | 2/1996 |
| JP | 2002-072157 | 3/2002 |

(Continued)

OTHER PUBLICATIONS

International Search Report Sep. 2, 2003.

(Continued)

*Primary Examiner*—Frank G Font
*Assistant Examiner*—Ryan Lepisto
(74) *Attorney, Agent, or Firm*—Katten Muchin Rosenman LLP

(57) ABSTRACT

An optical device enabling reducing device scale is constituted by M circulators (11a, 11b), (M being a natural number), a waveguide-type diffraction grating (12) including M first input/output waveguides (121a, 121b) formed at its one end and M×N second input/output waveguides (125a-1 to 125a-N and 125b-1 to 125b-N) formed at the other end, (N being a natural number), and paths from the M circulators being connected to the M first input/output waveguides; and N reflection-type optical switches (13-1 to 13-N) each for reflecting the optical paths for M adjacent waveguides out of the M×N second input/output waveguides(125a-1 to 125a-N and 125b-1 to 125b-N) and for switching over the returning-destination waveguide respectively, wherein the M circulators, the waveguide-type diffraction grating and N reflection-type optical switches are arranged in cascade. Consequently, the optical device can function preferably also as a wavelength selective optical switch available in a WDM transmission system.

1 Claim, 23 Drawing Sheets

FOREIGN PATENT DOCUMENTS

JP        2002-250827        9/2002

OTHER PUBLICATIONS

Nabeel A Riza, et al., Multi-Wavelength 2x2 Fiber-Optic Switch Structure using Mirror Array. Conf Proc Int LEOS Annu Meet (IEEE Lasers Electro Opt Soc, 1999, vol. 12th No. vol. 1 pp. 129-130.

Hirfofumi Shimomura, et al. Wavelength-division add/drop multiplexer using a single wavelength-filter and back-reflector switches. Opt Fiber Commun Conf. 1998, vol. 1998, pp. 80-82.

Senichi Suzuki. Photonic Devices Based on Arrayed-Waveguide Gratings. Nippon Telegraph and Telephone Corporation. vol. 82 No. 7 pp. 746-752, 1999.

* cited by examiner

WAVELENGTH SELECTIVE AND LEVEL ADJUSTING OPTICAL DEVICE

CROSS REFERENCE TO RELATED APPLICATION

The present application is a divisional of U.S. application Ser. No. 11/140,366 filed on May 27, 2005, now U.S. Pat. No. 7,239,770, the contents of which are herein incorporated by reference.

BACKGROUND OF THE INVENTION (1) Field of the Invention

The present invention relates to an optical device suitably applicable as a wavelength selective optical switch (λ-SW) for switching over optical paths for respective wavelengths as well as optical level adjusting devices (AGEQ: Automatic Gain Equalizer) for equalizing the optical levels associated with respective wavelengths.

(2) Description of the Related Art

In recent years, there have been introduced large-capacity transmission systems in order to cope with rapidly increasing data traffic due to the widespread of the Internet.

Building up of photonic networks including WDM transmission systems interconnected in mesh configuration in the future would enable provision of a plurality of transmission paths. Thereby it would be made possible to effectively utilize the limited transmission capacity by emphatically allotting lines to transmission paths much in demand depending on the time zone. A WDM transmission system can be realized by switching over the transmission paths for respective wavelengths, wherein there would be necessitated wavelength selective optical switches as essential devices.

Further, a long distance WDM transmission system utilizes amplification relays through optical amplifiers, which causes unevenness in the optical levels of respective wavelengths due to the wavelength dependency of the amplifier gain. Optical amplifiers have the property of concentrating the gain to wavelengths with high intensities, thus resulting in increases in the unevenness of optical levels at every passage through the amplifiers. In order to prevent this, it is necessary to uniformize the optical level for wavelength, and optical level adjusting devices capable of adjusting the amount of attenuation for each wavelength are inserted into transmission paths.

FIG. 20 is a schematic view illustrating a first conventional exemplary configuration (refer to Patent Literature 1) of the aforementioned wavelength selective optical switch. In wavelength selective optical switch 910 according to the first conventional exemplary configuration four waveguide-type diffraction gratings (AWG: Arrayed Waveguide Grating) 911 to 914 and an optical switch 919 are combined such that there are configured a 2×2 switch having two input ports and two output ports (an input port 915 and an add port 916 at the input side and an output port 917 and a drop port 918 at the output side).

In the wavelength selective optical switch illustrated in FIG. 20, demultiplexed lights obtained by demultiplexing through two AWGs 911, 912 at the input side are subjected to path through/switching processes by the optical switch 919 and then distributed to either of two multiplexing AWGs 913, 914 at the output side. Namely, the two AWGs 911, 912 are used to demultiplex wavelength-multiplexed light from the two ports 915, 916 at the input side and the other two AWGs 913, 914 out of the four AWGs are used to output the light on paths which are switched over by the optical switch 919 as wavelength-multiplexed light from the two ports 917, 918 at the output side FIG. 21 is a schematic view illustrating a second conventional exemplary configuration (refer to Patent Literature 2) of the wavelength selective optical switch. In the wavelength selective optical switch 920 illustrated in FIG. 21, input WDM light is directed to a switch 923 through an optical fiber 922 after the wavelength demultiplexing through an AWG 921 and then multiplexed and outputted by the AWG 921 to a port corresponding to an optical fiber 922 which is the switching-destination.

FIG. 22(a) is a schematic view illustrating a conventional exemplary configuration (refer to Patent Literature 3) of the optical level adjusting device. In an optical level adjusting device 930 illustrated in FIG. 22(a), lights wavelength demultiplexed by a first AWG 931 are inputted to a Mach Zehnder interferometer (MZI) 932 illustrated in FIG. 22(b). The intensities of the lights are adjusted by the MZI 932 and then the lights are multiplexed and outputted by a second AWG 933.

However, the aforementioned wavelength selective optical switch illustrated in FIG. 20 employs four AWGs 911 to 914 and on account of many AWGs being used there is a problem of increasing the size of the entire wavelength selective optical switch 910.

Further, the wavelength selective optical switch illustrated in FIG. 21 employs a single AWG. However, there is a need for connecting the substrate forming the AWG 921 and the respective optical switches 922 through optical fibers, wherein the number of the optical fibers should corresponds to the number of ports, with the result that there occurs the problem of increasing the device size.

Further, the optical level adjusting device 930 illustrated in FIG. 22(a) employs two AWGs 931, 932, with the result that there occurs the problem of increasing the size of the entire optical level adjusting device.

The present invention has been made in view of the aforementioned problems and aims at providing optical devices capable of functioning as a wavelength selective optical switch or optical level adjusting device and enabling reduction in the device size (device scale).

Patent Literature 1
The Journal of the Institute of Electronics, Information and Communication Engineers, Vol. 82, No. 7, pp. 746-752, July 1999
Patent Literature 2
Japanese Patent Laid-Open (Kokai) HEI 8-46569
Patent Literature 3
Japanese Patent Laid-Open (Kokai) 2002-250827

SUMMARY OF THE INVENTION

In order to attain the aforementioned object, an optical device according to the present invention includes M circulators, (M being a natural number) ; a waveguide-type diffraction grating including M first input/output waveguides formed at its one end and M×N second input/output waveguides formed at the other end thereof, (N being a natural number) and respective paths from the M circulators being connected to the M first input/output waveguides; and N reflection-type optical switches each for reflecting the optical paths for M adjacent waveguides out of the M ×N second input/output waveguides and for switching over the returning-destination waveguide in the form of the waveguide as destination of returning reflection light respectively, wherein the M circulators, the waveguide-type diffraction grating and N reflection-type optical switches are arranged in cascade.

Therefore, with the optical device according to the present invention, there is provided an advantage that it is possible to configure a wavelength selective optical switch with device scale reduced significantly as compared with conventional configurations, while employing a single waveguide-type diffraction grating as a component, without requiring any connection through optical fibers.

Preferably, each of the reflection-type optical switches may be constituted by lens capable of collimating light emitted from the M second input/output waveguides and a tilt type mirror for switching over the waveguide to which the light collimated by the lens returns.

Preferably, each of the reflection-type optical switches may be constituted by a Mach-Zehnder interferometer circuit constituted by interference waveguides for causing interference in terms of light from said M second input/output waveguides, M branch waveguides connected at their one ends to the interference waveguides, a reflecting member formed at the other ends of the respective branch waveguides and heaters capable of adjusting, by a thermo-optic effect, the optical path length difference in terms of each light propagating through the respective branch waveguides.

Also, each of the reflection-type optical switches may be constituted by a Mach-Zehnder interferometer circuit constituted by interference waveguides for causing interference of light from the M second input/output waveguides, M branch waveguides connected at their one ends to the interference waveguides, a reflecting member formed at the other ends of the respective branch waveguides, and the reflecting member in the Mach-Zehnder interferometer circuit is constituted by piston-operation type mirrors capable of adjusting the difference in the respective optical path lengths between the reflecting member and the interference waveguides.

Also, each of the reflection-type optical switches may be configured to switch over said returning-destination waveguide, by utilizing a magneto-optical effect.

Preferably, variable light attenuators may be interposed between the respective second input/output waveguides of the waveguide-type diffraction grating and the reflection-type optical switches.

Also, an optical device according to the present invention includes P first circulators, (P being a natural number); a first waveguide-type diffraction grating including P first input/output waveguides formed at its one end and N second input/output waveguides formed at the other end thereof, (N being a natural number) and respective paths from the first circulators being connected to the P first input/output waveguides; Q second circulators, Q being a natural number; a second waveguide-type diffraction grating including Q third input waveguides formed at its one end and N fourth input/output waveguides formed at the other end thereof, respective paths from the second circulators being connected to the Q third input waveguides; and N transmission/reflection switches interposed between the second input/output waveguides of the first waveguide-type diffraction grating and the fourth input/output waveguides of the second waveguide-type diffraction grating, the transmission/reflection switches being for switching over between the transmission and the reflection of light propagating through the respective waveguides, wherein the first circulators, the first waveguide-type diffraction grating, the transmission/reflection switches, the second waveguide-type diffraction grating and the second circulators are arranged in cascade.

Therefore, with the optical device according to the present invention, it is possible to configure a wavelength selective optical switch with the first and second optical circulators, the first and second waveguide-type diffraction gratings and the transmission/reflection switches, thus providing an advantage that it is possible to realize a wavelength selective optical switch with a significant reduction of device scale, without requiring connections through optical fibers.

In this case, each of the transmission/reflection switches may be constituted by a cantilever-type mirror.

Also, variable light attenuators may be interposed between the first waveguide-type diffraction grating and the transmission/reflection switches or between the transmission/reflection switches and the second waveguide-type diffraction grating.

Also, an optical device according to the present invention includes two circulators; a waveguide-type diffraction grating including two first input/output waveguides formed at its one end and 2×N second input/output waveguides formed at the other end thereof, (N being a natural number) and respective paths from the two circulators being connected to the two first input/output waveguides; and N reflection-type optical switches each for reflecting the optical paths for every two adjacent waveguides, out of the 2×N second input/output waveguides, and for switching over the returning-destination waveguide respectively, wherein the two circulators, the waveguide-type diffraction grating and N reflection-type optical switches are arranged in cascade, and each of said reflection-type optical switches is constituted by; an optical circuit for folding light from one of the adjacent two second input/output waveguides such that it is guided into the other waveguide, and two transmission/reflection switches for switching over between the transmission and the reflection of light propagating through the two adjacent second input/output waveguides.

In this case preferably each of said transmission/reflection switches may be constituted by a cantilever-type mirror.

Therefore, with the optical device according to the present invention, it is possible to configure a wavelength selective optical switch with device scale reduced significantly as compared with conventional configurations while employing a single waveguide-type diffraction grating as a component, without requiring any connection through optical fibers.

Preferably, the optical circuit may be constituted by a reflecting mirror and the two adjacent second input/output waveguides may be configured such that light from one of these second input/output waveguides is reflected by the reflecting mirror and then guided into the other waveguide.

Also, the optical circuit maybe constituted by a bent waveguide forming a bypass connection between the two adjacent second input/output waveguides.

Further, variable light attenuators maybe interposed between the waveguide-type diffraction grating and the respective reflection-type optical switches.

Also, an optical device according to the present invention includes M circulators, (M being a natural number); a waveguide-type diffraction grating including M first input/output waveguides formed at its one end and N second input/output waveguides formed at the other end thereof, (N being a natural number )and respective paths from the M circulators being connected to the M first input/output waveguides; and N light-intensity adjusting circuits each capable of reflecting light from the N second input/output waveguides and adjusting the light intensity of the reflected light respectively; wherein the M circulators, the waveguide-type diffraction grating and the N light-intensity adjusting circuits are arranged in cascade.

Therefore, with the optical device according to the present invention, it is possible to configure a optical level adjusting device by employing only a single waveguide-type diffraction grating, thereby providing an advantage that it is possible to configure a optical level adjusting device with device pertinent significantly reduced as compared with the prior art.

In this case, each of the light-intensity adjusting circuits may be constituted by a Mach-Zehnder interferometer constituted by a dividing waveguide for dividing or branching one of the N second input/output waveguides into two, two branch waveguides connected at their one ends to the paths divided or branched into two by the dividing waveguide, reflecting members formed at the other ends of the respective branch waveguides and heaters capable of adjusting, by a thermo-optic effect, the difference between the optical path lengths of light propagating through the respective branch waveguides.

Further, each of the light-intensity adjusting circuits may be constituted by a Mach-Zehnder interferometer constituted by a dividing waveguide for dividing or branching one of the N second input/output waveguides into two, two branch waveguides connected at their one ends to the two paths divided or branched by the dividing or branching waveguide and reflecting members formed at the other ends of the respective branch waveguides, and the reflecting members in the Mach-Zehnder interferometer are constituted by piston-operation-type mirrors capable of adjusting the respective optical path length difference between the reflecting members and the branch waveguide.

Further, an optical device according to the present invention includes a waveguide-type diffraction grating including an input waveguide and an output waveguide formed at its one end and 2×N input/output waveguides formed at the other end thereof(N being a natural number) and the input waveguide and the output waveguide being in parallel with each other; and N light-intensity adjusting circuits each capable of guiding light from one input/output waveguide for propagating light from the input waveguide, out of adjacent the 2×N input/output waveguides, into the other input/output waveguide forming a optical path for outputting the light from the output waveguide and capable of adjusting the light intensity of the light; wherein the waveguide-type diffraction grating and N light-intensity adjusting circuits are arranged in cascade.

Therefore, with the optical device according to the present invention, it is possible to configure an optical level adjusting device by employing only a single waveguide-type diffraction grating, thereby providing an advantage that it is possible to configure an optical level adjusting device with device size significantly reduced as compared with the prior art.

In this case, each of the light-intensity adjusting circuits may be constituted by a Mach-Zehnder interferometer circuit capable of adjusting the light intensity of light from the one input/output waveguide by adjusting the optical path length difference between branch waveguides each other using a thermo-optic effect and an optical circuit for folding the light with a light intensity which has been adjusted by the Mach-Zehnder interferometer circuit such that it is guided into the other input/output waveguide.

Further, each of the light-intensity adjusting circuits is constituted by lenses and a tilt type mirror and the tilt type mirror constituting each light-intensity adjusting circuit is constituted by an array of integrated mirrors.

Further, an optical device according to the present invention includes a first waveguide-type diffraction grating including L input waveguides and L×M output waveguides, (L and M being natural numbers); M L×N optical switches each including L input paths and N output paths and being capable of switching over the output paths to which input light from the input paths is to be output, the input paths being connected for adjacent L waveguides out of the L×M output waveguides respectively; and a second waveguide-type diffraction grating connected to the output paths of the each of M L×N optical switches and each including M×N input waveguides and N output waveguides; wherein the first waveguide-typed if fraction grating, the M L×N optical switches and the second waveguide-type diffraction grating are arranged in cascade.

Therefore, with the optical device according to the present invention, it is possible to configure a wavelength selective optical switch by providing the first and second waveguide-type diffraction gratings and the optical switches, thus providing an advantage that connections through optical fibers, etc., in the wavelength selective switch can be eliminated and the device scale can be significantly reduced.

In this case, variable light attenuators may be interposed within the respective output waveguides of the first waveguide-type diffraction grating or within the respective input waveguides of the second waveguide diffraction grating.

DESCRIPTION OF THE PREFERRED EMBODIMENTS

Hereinafter, embodiments of the present invention will be described with reference to the drawings.

(a) Description of Waveguide-Type Diffraction Gratings

Optical devices according to the present embodiment function as a wavelength selective optical switch or an optical level adjusting device. As components of the optical devices, AWGs 11A according to two types of aspects illustrated in FIG. 23(a) and FIG. 23(b) may be utilized. Hereinafter, description will be given of AWGs applied to the optical devices according to respective embodiments of the present invention.

Figure 23A:
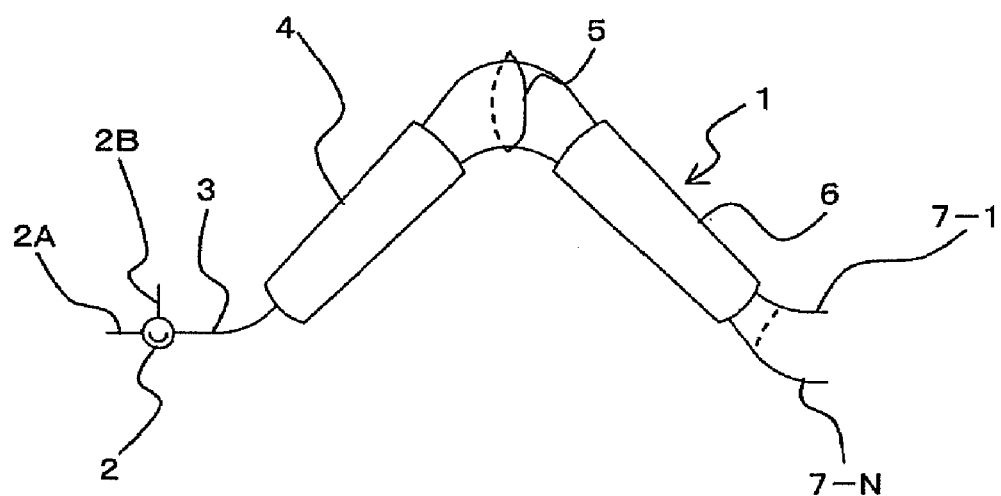
FIG. 23($a$) and FIG. 23($b$) are schematic views illustrating an AWG as a component of the optical device.

The AWG 1 according to the aspect illustrated in FIG. 23(a) is provided with a single multiplexing-side waveguide 3 as a waveguide for inputting and outputting optical signals and an optical circulator 2 is connected to the multiplexing-side waveguide 3. The AWG 1 is constituted by a slab waveguide 4, a plurality of channel waveguides 5 with different lengths, a slab waveguide 6 and N (N is a natural number more than one) demultiplexing-side waveguides 7-1 to 7-N, which are formed on a substrate, along with the aforementioned input/output waveguide 3.

Namely, when wavelength-multiplexed light is input to the multiplexing-side waveguide 3 through the optical circulator 2, the incident multi-length light is diffused in the slab waveguide 4 and then outputted to the channel waveguides 5 arranged in parallel in the order in terms of lengths, where phase differences are caused depending on the respective lengths. Then, light with different phases is emitted from the channel waveguides 5 to the slab waveguide 6. In the slab waveguide 6, interference of the wavelength-multiplexed light with different phases is caused, whereupon then lights with the respective wavelengths are propagated through the different demultiplexing-side waveguides 7.

Consequently, when wavelength-multiplexed light having N wavelengths is inputted from the multiplexing-side waveguide 3, demultiplexed lights obtained by the demultiplexing of the input wavelength-multiplexed light having the N wavelengths are propagated through the respective N demultiplexing-side waveguides 7. Further, when lights having different wavelengths are inputted from the respective demultiplexing-side waveguides 7-1 to 7-N, wavelength-multiplexed light having the respective inputted wavelengths which have been multiplexed can be propagated through the demultiplexing-side waveguide 3.

Further, the optical circulator 2 is adapted for outputting light inputted from an IN (input) port 2A to the multiplexing-side waveguide 3 of the AWG 1 and besides for outputting light from the multiplexing-side waveguide 3 through an OUT (output) port 2B. Thus, when wavelength-multiplexed light is inputted from the IN port 2A, wavelength demultiplexed or separated lights are generated in the demultiplexing-side waveguides 7. When lights with different wavelengths are inputted from the respective demultiplexing-side waveguides 7-1 to 7-N, wavelength-multiplexed light of the input lights is generated from the OUT port 2B. Thus, the single AWG 1 may be employed for both multiplexing/demultiplexing.

Figure 23B:
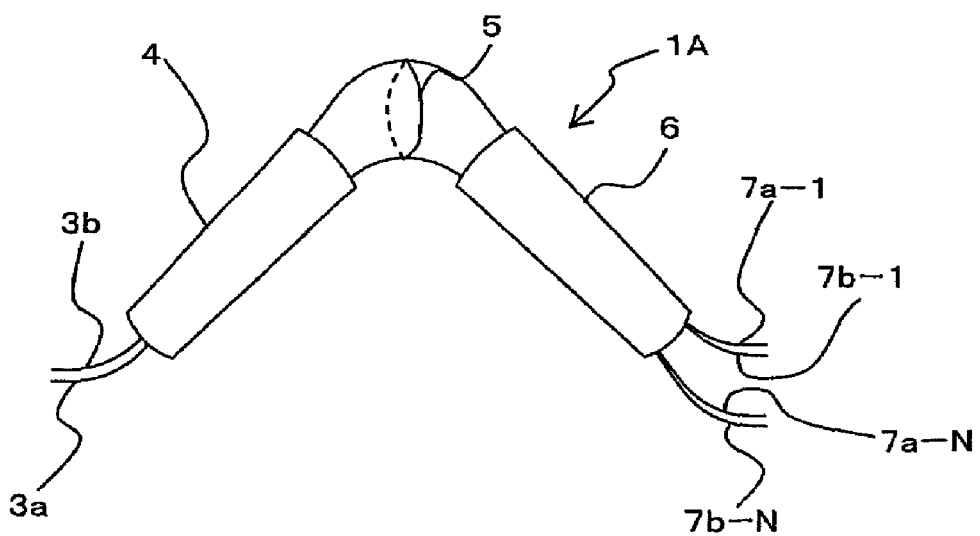

FIG. 23(b) illustrates an AWG 1A with a resolution that is twice that of the AWG 1 illustrated in FIG. 23(a). The AWG 1A is different from the AWG 1 illustrated in FIG. 23(a) in that it includes 2×N (twice N) demultiplexing-side waveguides 7a-1 to 7a-N and 7b-1 to 7b-N, along with two multiplexing-side waveguides 3a, 3b. Further, in FIG. 23(b), the same reference characters as those in FIG. 23(a) designate similar components.

The aforementioned two multiplexing-side waveguides 3a, 3b are placed adjacent to each other and the two waveguides 7a-i, 7b-i (i is an arbitrary number within the range of 1 to N) are formed such that they are close to each other in association with the aforementioned multiplexing-side waveguides 3a, 3b.

Hereinafter, the notation of a×b as previously given represents the number of objects existing in number expressed by the multiplied values of a and b.

Thus, for example, wavelength-multiplexed light inputted from the multiplexing-side waveguide 3a can be branched or demultiplexed and outputted through the demultiplexing-side waveguides 7a-1 to 7a-N (the odd-numbered waveguides from the top in the array of the demultiplexing-side waveguides 7a-1 to 7a-N and 7b-1 to 7b-N).

Likewise, for example, wavelength-multiplexed light inputted from the multiplexing-side waveguide 3b can be branched and outputted through the demultiplexing-side waveguides 7b-1 to 7b-N (the even-numbered waveguides from the top in the array of the demultiplexing-side waveguides 7a-1 to 7a-N and 7b-1 to 7b-N).

Further, the AWG 1A may be designed to be capable of multiplexing/demultiplexing WDM light with a wavelength interval of $\Delta\lambda$ and a number of wavelengths of N to obtain light with a wavelength interval of $\Delta\lambda/2$ and a number of wavelengths of 2×N. Generally, the multiplexing-side slab and the demultiplexing-side slab are designed to be identical in shape or profile. Further, the second waveguide is added to the multiplexing side such that it is spaced apart from the first waveguide with the same interval as that in the array of demultiplexing-side waveguides.

While the AWG 1A illustrated in FIG. 23(b) is provided with two multiplexing-side waveguides 3a, 3b, there may be provided three or more multiplexing-side waveguides and, in such cases, the AWG will have a resolution that is three times that of the AWG 1. Also, combination between an AWG having a resolution twice that of the AWG 1 and a circulator would enable realizing a multiplexing/demultiplexing function equivalent to that of four AWGs.

(b) Description of a First Embodiment

Figure 1:
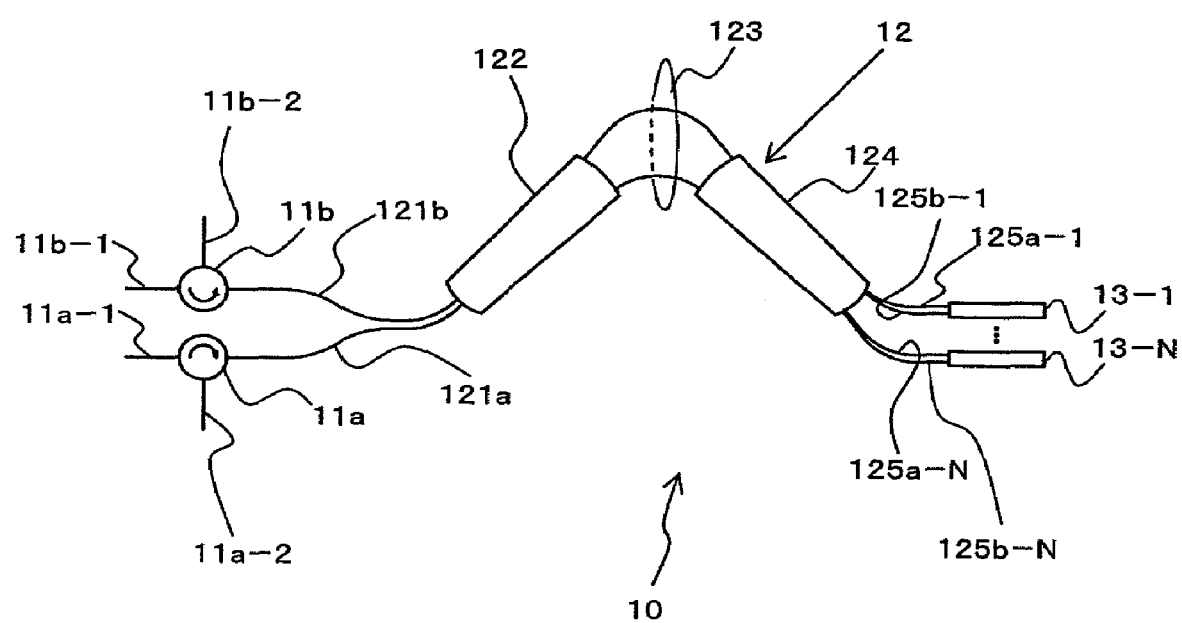
FIG. 1 is a schematic view illustrating an optical device according to a first embodiment of the present invention.

FIG. 1 is a schematic view illustrating an optical device according to the first embodiment of the present invention. The optical device 10 illustrated in FIG. 1 can operate as a wavelength selective optical switch and includes two optical circulators 11a, 11b capable of functioning as independent input/output ports, an AWG 12 and N reflection-type optical switches 13-1 to 13-N, which are arranged in cascade.

The AWG 12 has a configuration similar to that of the aforementioned AWG 1A illustrated in FIG. 23(b) and includes two first input/output waveguides 121a, 121b formed at its one end and 2×N (N is a natural number) second input/output waveguides 125a-1 to 125a-N and 125b-1 to 125b-N formed at the other end thereof, wherein respective paths from two optical circulators 11a, 11b are connected to the first input/output waveguides 121a, 121b. Further, 122 and 124 designate slab waveguides and 123 designates channel waveguides.

Each of the N reflection-type optical switches 13-1 to 13-N is adapted for reflecting the optical paths of every two adjacent waveguides 125a-i and 125b-i (i is an arbitrary integer within the range of 1 to N) out of the 2×N second input/output waveguides 125a-1 to 125-N and 125b-1 to 125b-N and for switching over the returning-destination waveguide, thus constituting a 2×2 optical switch having two input ports and two output ports (hereinafter, the notation of an a×b optical switch represents the number of ports functioning as input ports, in the optical switch, is a and the number of ports functioning as output ports is b).

For example, the reflection-type 2×2 optical switch 13-1 is optically coupled to the two second input/output waveguides 125a-1, 125b-1 and is capable of reflecting light inputted from either of the second input/output waveguides 125a-1, 125b-1 and selectively switching over the returning-destination waveguide between the waveguide from which the light is input and the other waveguide.

The light reflected by the reflection-type 2×2 optical switch 13-i is inputted to either of the second input/output waveguides 125a-i, 125b-i, again, and then output from the two first input/output waveguides 121a, 121b and the optical circulators 11a, 11b connected to the respective paths from the first input/output waveguides 121a, 121b, through the slab waveguide 124, the channel waveguides 123 and the slab waveguide 122.

With this configuration, when the optical switches 13-1 to 13-N are set to return the optical path of reflected light to the original waveguide, light inputted from the input port 11a-1 of the optical circulator 11a is outputted from the output port 11a-2 of the optical circulator 11a while light inputted from the input port 11b-1 of the optical circulator 11b is outputted from the output port 11b-2 of the optical circulator 11b.

On the other hand, when the optical switches 13-1 to 13-N are set to direct the optical path of reflected light to the other waveguide, light inputted from the input port 11a-1 of the optical circulator 11a is outputted from the output port 11b-2 of the optical circulator 11b while light inputted from the input port 11b-1 of the optical circulator 11a is outputted from the output port 11a-2 of the optical circulator 11a.

The aforementioned reflection-type 2×2 optical switches 13-1 to 13-N may be configured, for example, according to four types of aspects as illustrated in FIG. 2 to FIG. 5.

Figure 2:
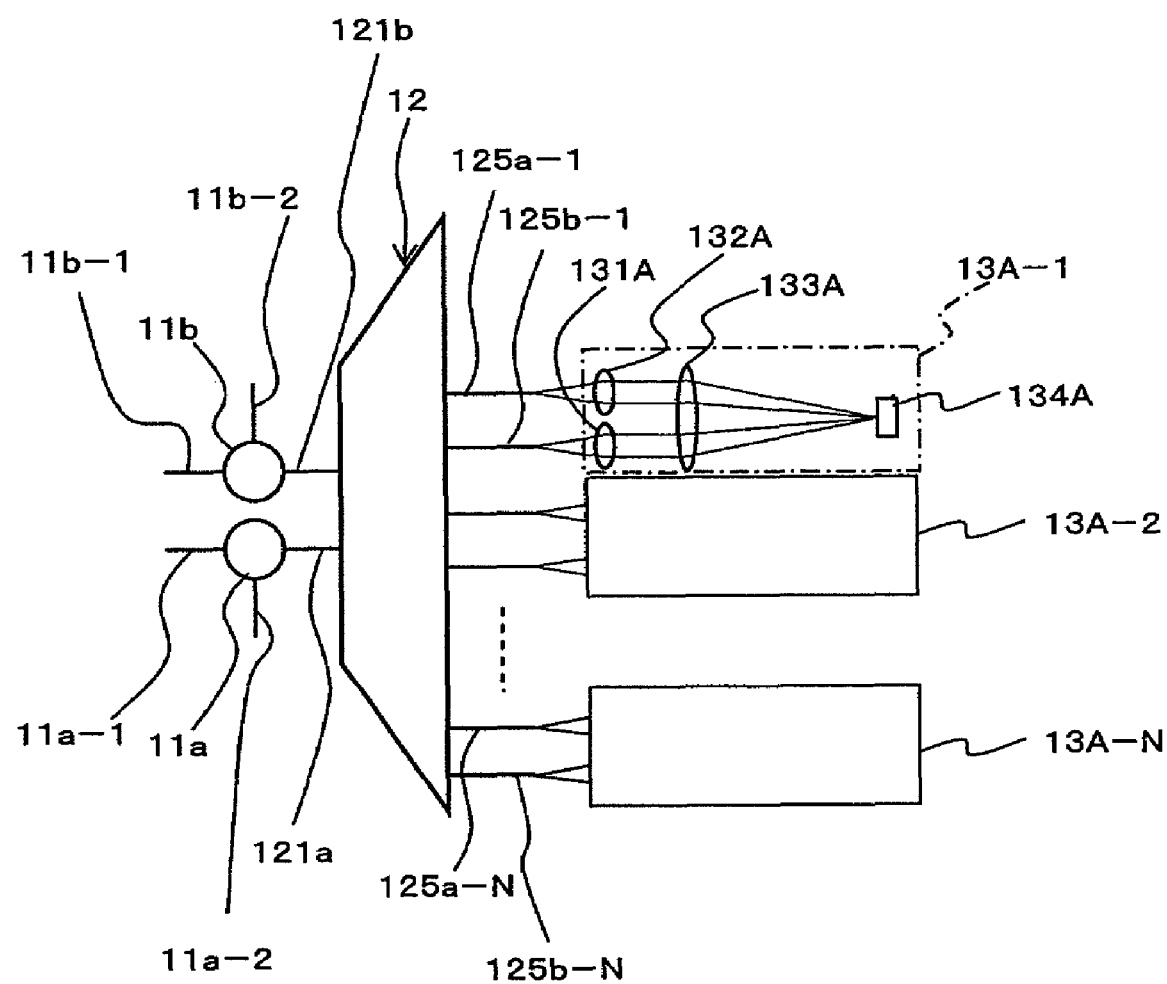
FIGS. 2 to 5 are schematic views illustrating main parts of the optical device according to the first embodiment of the present invention.

As a configuration according to the first aspect, as illustrated in FIG. 2, the aforementioned reflection-type 2×2 optical switches 13-1 to 13-N may be optical switches 13A-1 to 13A-N constituted by lenses 131A to 133A and a small-angle variable mirror (tilt mirror) 134A such as an MEMS (Micro Electric Mechanism System) mirror.

In FIG. 2, the lenses 131A, 132A can collimate light which has been emitted from the PLC (Planer Lightwave Circuit) end face provided with the AWG 12 and propagated through the second input/output waveguides 125a-1, 125b-1, into parallel light. The lens 133A condenses the light collimated by the lenses 131A, 132A such that it is focused on the surface of the small-angle variable mirror 134A.

The small-angle variable mirror 134A is configured to be a tilt type mirror having a variable surface level, thus enabling changing the incident angle of light inputted from the lens 133A for switching over the returning-destination waveguide to which the light collimated by the lenses 131A, 132A is to be reflected back. The tilt mirror 134A is generally constituted by an array of integrated mirrors.

Consequently, with the optical switch 13A-i according to the first aspect, the angle of the small-angle variable mirror 134A can be selectively changed over to selectively switch over the waveguide to which the returning light of light inputted from the second input/output waveguide 125a-i or 125b-i is to be propagated, between the two second input/output waveguides 125a-i, 125b-i.

Further, the respective lenses 131A to 133A in the aforementioned switches 13A-1 to 13A-N may be constituted by an array of integrally-arranged lenses and the mirror 134A may be also constituted by an array of integrally-arranged lenses.

Figure 3:
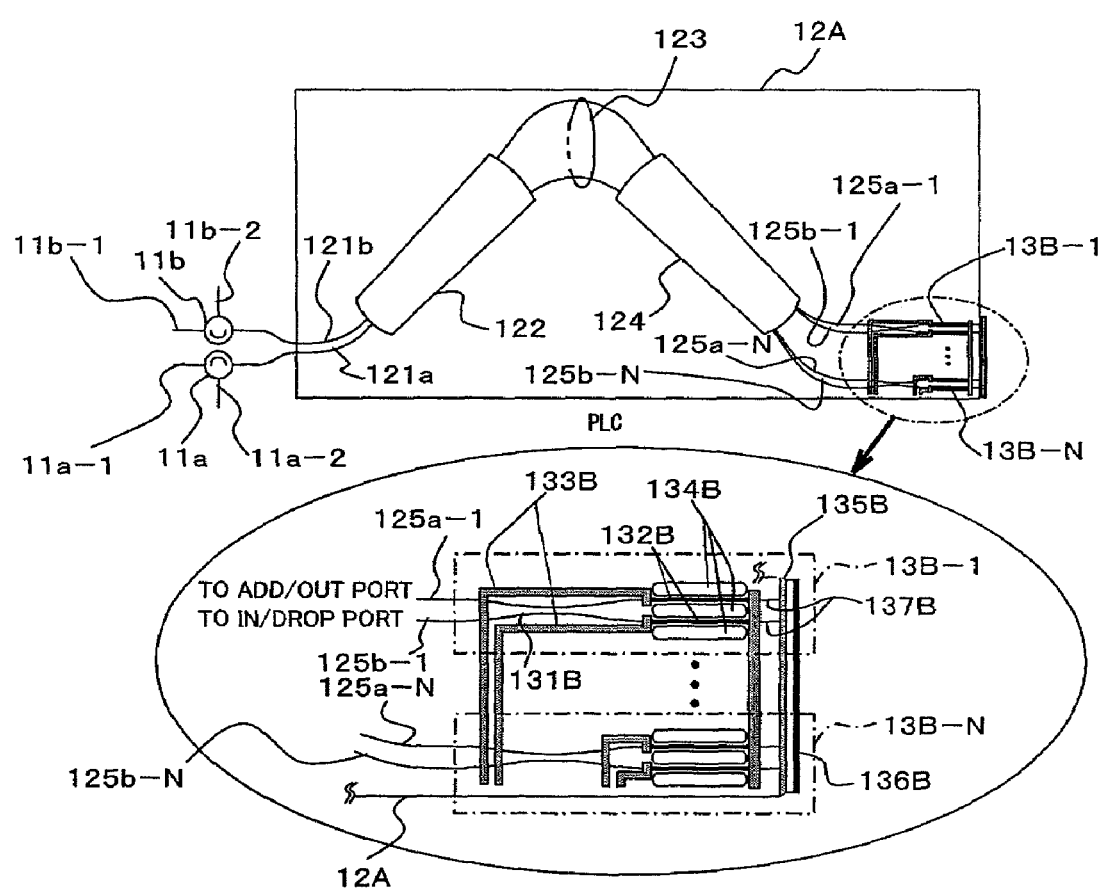

Further, as a configuration according to the second aspect, as illustrated in FIG. 3, the reflection-type 2×2 optical switches 13-1 to 13-N maybe reflection-type MZIs 13B-1 to 13B-N formed integrally on a substrate 12A on which the AWG 12 is formed.

The MZI 13B-i illustrated in FIG. 3 is constituted by a directional coupler 131B with two inputs and two outputs, two branch waveguides 137B connected at their one ends to two paths from the directional coupler 131B, shown as upper and lower branch waveguides in the figure, heaters 132B for heating the individual branch waveguides 137B forming the aforementioned two paths, electrodes 133B for supplying a voltage for the heating control to the heaters 132B, heat-insulating slots 134B formed between the branch waveguides 137N for preventing the heating controls for the two heaters 132B from affecting each other, a λ/4 plate 135B and a reflective film (reflective member) 136B formed at the end portion of the substrate 12A.

Attention being focused on the MZI 13B-1, the directional coupler 131B in the MZI 13B-1 functions as an interference waveguide with two inputs and two outputs for causing interference of light from the two second input/output waveguides 125a-1, 125b-1 and for causing interference of lights reflected by the reflective film 136B. When the lights from the two second input/output waveguides 125a-1, 125b-1 have the same phase, the upper and lower optical paths are reversed to propagate the lights to the post-stage.

Namely, light inputted from the port 11a-l is inputted to the MZI 13-1 through the waveguide 125a-1 and propagates through the lower branch waveguide 137B out of the two output paths in the figure, in the-state of the upper and lower optical paths being reversed. Similarly, light inputted from the port 11b-1 is inputted through the waveguide 125b-1 and propagates through the upper branch waveguide 137B out of the two output paths in the figure, in the state of the upper and lower optical paths being reversed.

The heaters 132B are formed on the respective branch waveguides 137B connected to the two paths from the directional coupler 131B and are capable of adjusting the difference in the optical path lengths between lights propagating through the respective waveguides 137B utilizing a thermo-optic effect.

More specifically, the heaters 132B cause refractive-index changes in the upper and lower branch waveguides 137B to cause a phase difference between lights propagating through the two branch waveguides 137B.

The reflective film 136B is connected to the other ends of the branch waveguides 137B forming the two paths and reflects light along the two paths from the branch waveguides 137. The heaters 132B can apply heater heating to light propagating through the optical paths adapted for causing lights to travel back-and-forth therethrough by the reflective film 136B along the branch waveguides 137B. This can reduce by half the electric power consumption of the heaters as compared with the configurations of MZIs without folding the optical paths by the reflective film 136B.

When light inputted to the reflection-type 2×2 optical switch 13B-1 is to be outputted to the second input/output waveguides 125a-1, 125b-1 as output-destination of inputted light without any change over therebetween as they are, the heater heating is controlled such that lights propagating through the upper and lower branch waveguides 137B have the same phase. On the other hand, when the second input/output waveguide 125a-1, 125b-1 as output-destination of inputted light for input light is to be changed over, the heater heating is controlled such that lights propagating through the upper and lower branch waveguides 137B have the opposite phases.

Consequently, when lights which have been propagated through the upper and lower branch waveguides 137B are returned back to the directional coupler 131B, in the case where the phases of the two lights are controlled by the heaters 132B to have the same phase, the returning lights which have been propagated through two waveguides, i.e., the upper and lower waveguides are outputted to the original paths, again (the second input/output waveguides 125a-1, 125b-1 identical to the one through which the light has been inputted), in the state of the optical path being reversed.

On the contrary, in the case where the phases of the two lights are controlled by the heaters 132B to have opposite phases, the lights which have been propagated through the reversed paths before being reflected at the reflective film 136B are output through the paths communicating with the other second input/output waveguides 125a-1, 125b-1 than the second input/output waveguides 125a-1, 125b-1 through which the lights have been inputted, in the state of the optical paths not being reversed.

In other words, the phases of lights traveling back and forth through the optical paths in the MZI 13B-1 to be multiplexed are controlled through refractive index changes caused by the heater heating. When they are controlled to be the same phase, the upper and lower ports are changed over with each other, while when they are controlled to be opposite phases, lights are returned back to the ports through which they have been input.

Consequently, with the optical switch 13B-i according to the second aspect, it is possible to selectively switch over the waveguide through which there turning light of light inputted from the second input/output waveguide 125a-i or 125b-i, between the two second input/output waveguides 125a-i, 125b-i, by the heating control for the heaters 132B through the electrodes 133B.

Figure 4:
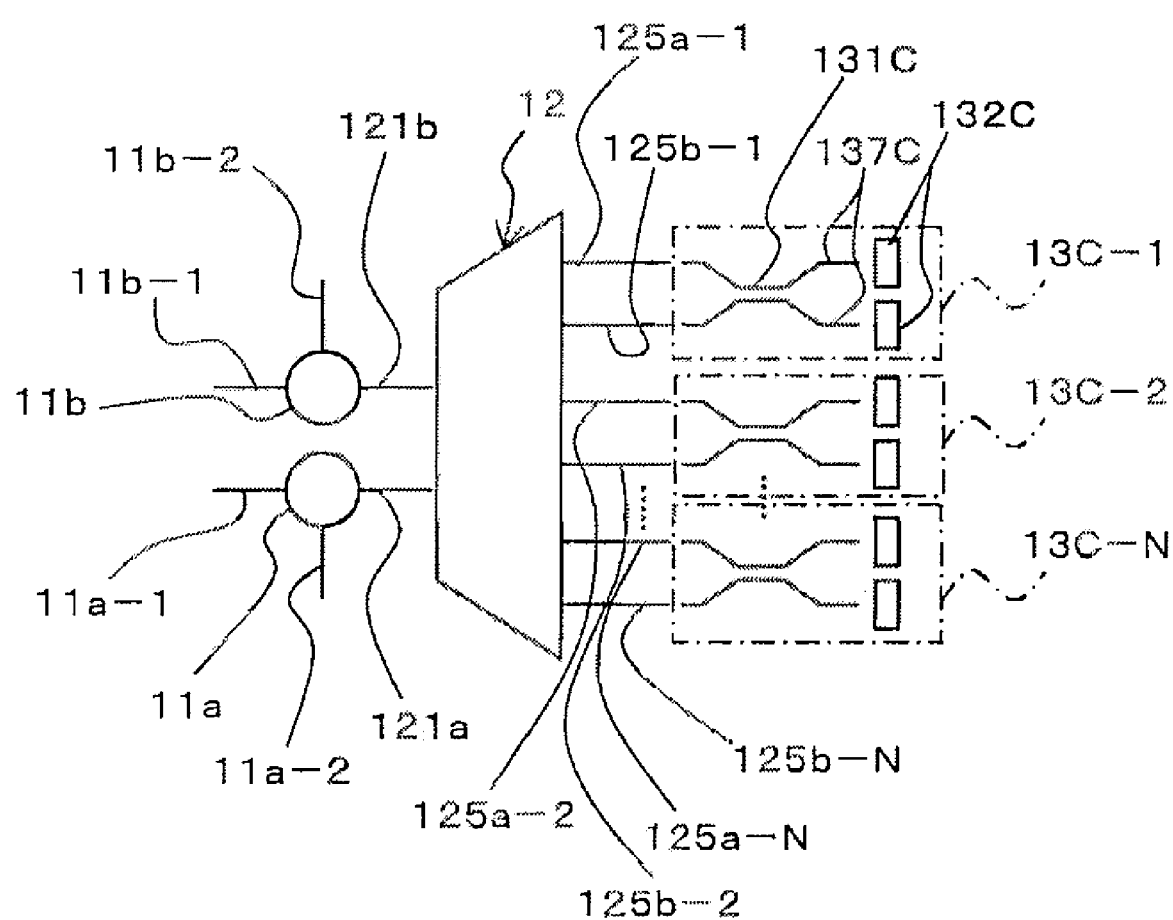

Also, as a configuration according to the third aspect, as illustrated in FIG. 4, the reflection-type optical switches 13-1 to 13-N may be reflection-type optical switches 13C-1 to 13C-N each constituted by a directional coupler 131C which functions as an interference waveguide similarly to that illustrated in FIG. 3 (see the reference character 131B), two branch waveguides 137C connected at their one ends to the directional coupler 131C, and piston-operation small mirrors 132C.

The piston-operation small mirrors 132C function as reflective members formed at the other ends of the respective branch waveguides 137B and are configured such that the surfaces of the mirrors 132C can be moved forward and rearward in parallel with the optical path under external control, whereby it is made possible to cause differences in the optical path length between lights traveling back and forth through the two branch waveguides 137C. In other words, the piston-operation small mirrors 132C function as piston-operating type mirrors capable of adjusting the difference in the optical path length between the directional coupler 131C and the surface of the mirror 132C.

Consequently, when lights propagated through the upper and lower branch waveguides 137C are returned back to the directional coupler 131B, in the case where the difference in the optical path length is controlled by the mirrors 132C such the two lights have the same phase, the returning lights which have been propagated through the upper and lower waveguides are output to the original paths, again (the second input/output waveguide 125a-1, 125b-1 identical to the one through which the light has been inputted), in the state of the optical path being reversed.

On the contrary, in the case where the difference in the optical path length is controlled by the mirrors 132C such that the two lights have opposite phases, the lights which have been propagated through the reversed paths before being reflected at the mirrors 132C are outputted through the paths communicating with the other second input/output waveguides 125a-1, 125b-1 than those through which the lights have been input, in the state the optical paths not being reversed.

Consequently, with the optical switch 13C-i according to the third aspect, it is possible to adjust the difference between the optical path lengths for light inputted from the second input/output waveguide 125a-i or 125b-i by adjusting the positions of the mirror surfaces of the mirrors 132C in parallel to the optical path, which enables selectively switching over the waveguide to which the returning light of light inputted from the second input/output waveguide 125a-i or 125b-i is to be propagated, between the two second input/output waveguides 125a-i, 125b-i.

Figure 5:
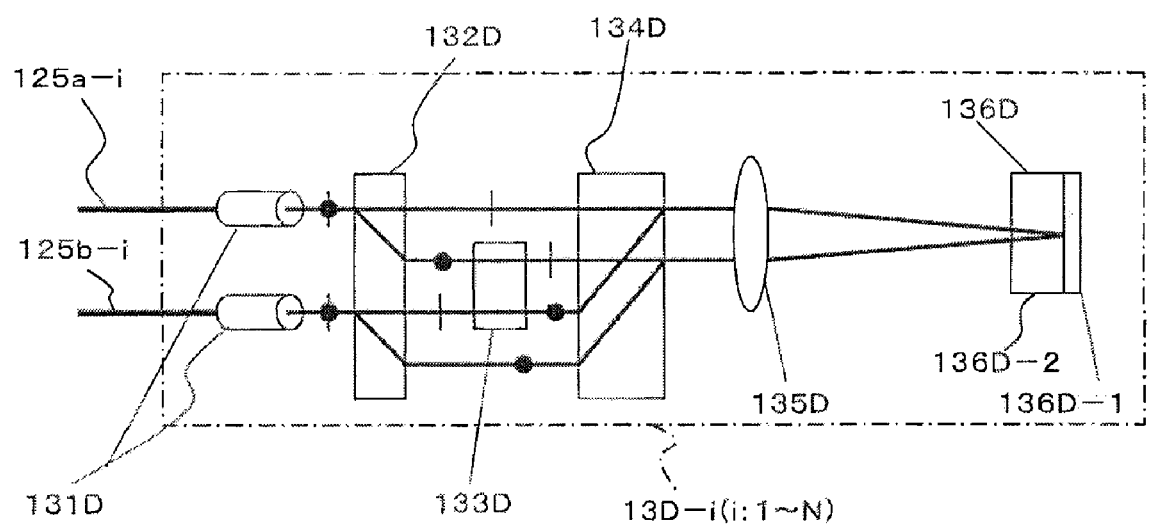

Also, as a configuration according to the fourth aspect, as illustrated in FIG. 5, the reflection-type 2×2 optical switch 13-i (i: an arbitrary integer within the range of from 1 to N) may be a reflection-type 2×2 optical switch 13D-i configured to switch over the aforementioned returning-destination waveguide using a magneto-optics effect.

The reflection-type 2×2 optical switch 13D-i illustrated in FIG. 5 is constituted by two collimators 131D in association with two paths connected to the second input/output waveguides 125a-i, 125b-i, a birefringent plate 132D, a λ/2 plate (half-wave plate) 133D, a birefringent plate 134D, a lens 135D and an MO (Magneto Optic)-medium-attached mirror 136D.

The two collimators 131D collimate light inputted from the second input/output waveguides 125a-i, 125b-i and also collimate the returning light to be emitted to the second input/output waveguides 125a-i, 125b-i.

The birefringent plates 132D, 134D propagate longitudinal polarization and lateral polarization of input light with different refractive indexes and are capable of separating light from 125a-i and 125b-i into polarization components which will propagate through different optical paths and composing the polarization components inputted from the different optical paths. The λ/2 plate 133D outputs longitudinally-polarized light when receiving laterally-polarized light and outputs laterally-polarized light when receiving longitudinally-polarized light.

The lens 135D condenses light from the birefringent plate 134D to cause it to be reflected by the MO-medium-attached mirror 136D and condenses light reflected by the MO-medium-attached mirror 136D and emits it to the birefringent plate 134D. Further, the MO-attached mirror 136D is constituted by a mirror 136D-1 for reflecting light from the lens 135D and an MO medium 136D-2 attached to the surface of the mirror 136D-1. By supplying magnetic energy to the MO medium 136D-2, the polarization of reflected light can be rotated by 0 degree or 90 degree.

With the reflection-type 2×2 optical switch 13D-i configured as described above, for example, light from the second input/output waveguide 125a-i is separated into longitudinally-polarized light and laterally-polarized light by the birefringent plate 132D and the laterally-polarized light is converted into longitudinally-polarized light by the λ/2 plate 133D. The birefringent plate 134D outputs longitudinally-polarized light separated by the birefringent plate 132D and the longitudinally-polarized light from the λ/2 plate 133D to the lens 135D through different optical paths.

The two longitudinally-polarized lights from the birefringent plate 134D are condensed by the lens 135D and input to the M/O medium 136D-2. The M/O medium 136D-2 rotates, by 0 degree or 90 degree, the polarization of light reflected by the mirror 136D-2, under the control of the magnetic field applied thereto. By controlling the magnetic field applied to the M/O medium 136D-2 such that the polarization is rotated by 0 degree, the reflected light can be kept to be longitudinally-polarized light and can be returned back to the second input/output waveguide 125*a-i* through the path through which it has been propagated.

Also, light from the second input/output waveguide 125*b-i* is converted into two laterally-polarized lights by the birefringent plate 132D and the λ/2 plate 133D. By controlling the applied magnetic field such that the polarization is rotated by 0 degree, the reflected light can be kept to be laterally-polarized light and can be outputted to the original second input/output waveguide 125*b-i*.

By controlling the magnetic field applied to the M/O medium 136D-2 such that the polarization is rotated by 90 degree, longitudinally-polarized light and laterally-polarized light from the second input/output waveguides 125*a-i*, 125*b-i* are changed over in terms of reflected light and in consequence outputted to the output-destination waveguide which is changed over from the waveguide through which the light has been inputted. Namely, the reflected light of light from the waveguide 125*a-i* is outputted from the waveguide 125*b-i* while the reflected light of light from the waveguide 125*b-1 is outputted from the waveguide 125*a-i*.

Consequently, with the optical switches 13D-*i* according to the fourth aspect, it is possible to selectively switch over the waveguide for propagating the returning light of input light from the second input/output waveguide 125*a-i* or 125*b-i*, between the two second input/output waveguides 125*a-i*, 125*b-i*, by controlling the magnetic field applied to the M/O medium 136D-2.

With the aforementioned configuration, in the optical device 10 according to the first embodiment of the present invention, the ports 11*a*-1, 11*b*-1 may be utilized as an add port and an IN port and the ports 11*a*-2, 11*b*-2 may be utilized as a drop port and an OUT port to operate the optical device 10 as a switch for performing ADM (Add/Drop Multiplexing) switching by employing only a single AWG.

Namely, in order to output, from the OUT port 11*b*-2, light with a predetermined wavelength out of wavelength-multiplexed light inputted from the IN port 11*b*-1, the optical switch 13-*i* for switching over the optical path for this wavelength is controlled such that the reflected light is returned back through the original optical path. Consequently, the reflected light is outputted from the OUT port 11*b*-2 through the multiplexing-side waveguide 121*b* and the optical circulator 11*b*.

Furthermore, in order to output, from the drop port 11*a*-2, light with a predetermined wavelength out of wavelength-multiplexed light inputted from the IN port 11*b*-1, the optical switch 13-*i* for switching over the optical path for this wavelength is controlled such that the reflected light is propagated through the other optical path. Consequently, the reflected light is outputted from the drop port 11*a*-2 through the multiplexing-side waveguide 121*a* and the optical circulator 11*a*. By similarly controlling the optical switch 13-*i*, light with a predetermined wavelength can be output from the add port 11*a*-1 to the OUT port 11*b*-2.

Also, with the optical switches according to the second to fourth aspects, both the ports 11*a*-1, 11*b*-1 may be utilized as an IN port and both the ports 11*a*-2, 11*b*-2 may be utilized as an OUT port to operate the optical switches as switches for performing wavelength cross connections by employing only a single AWG.

As described above, with the optical device according to the first embodiment of the present invention, there is provided an advantage that it is possible to configure a wavelength selective optical switch with device scale significantly reduced as compared with conventional configurations while utilizing a single AWG as a component thereof.

Further, with the optical device utilizing the reflection-type optical switches 13B-1 to 13B-N according to the second aspect, it is possible to configure a wavelength selective optical switch with a PLC including a single AWG and the optical switches 13-1 to 13-N formed on the same substrate, thereby providing an advantage that it is possible to realize a wavelength selective optical switch with a reduced device size while reducing the number of AWGs utilized as device components as compared with the prior art.

While the reflection-type optical switches illustrated in FIG. 2 to FIG. 5 are all 2×2 optical switches, it is also possible to configure an optical switch having two or more input/output ports by connecting the switch components illustrated in FIG. 2 to FIG. 5 to multi-stages of tree structures. This enables configuring an optical device as a wavelength selective optical switch having two or more input/output ports.

(b1) Description of Exemplary Modifications of the First Embodiment

Figure 6:
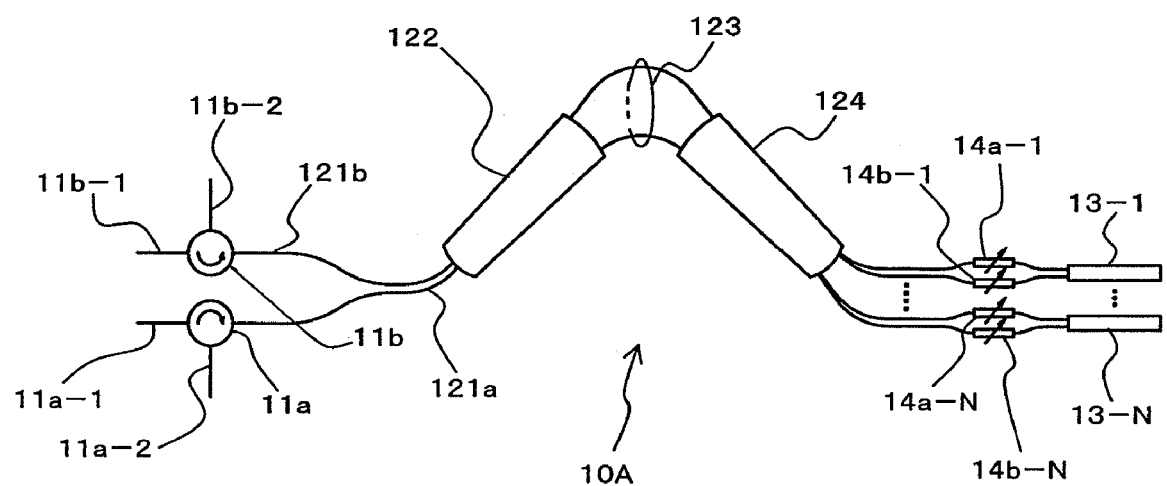
FIG. 6 is a schematic view illustrating the optical device according to an exemplary modification of the first embodiment of the present invention.

FIG. 6 is a schematic view illustrating an optical device 10A according to an exemplary modification of the first embodiment of the present invention. The optical device 10A illustrated in FIG. 6 is different from the aforementioned optical device 10 illustrated in FIG. 1 in that there are interposed variable optical attenuators (VOA) 14*a-i*, 14*b-i* for variably controlling the intensity of propagating light, between the second input/output waveguides 125*a-i*, 125*b-i* of the AWG 12 and the reflection-type optical switches 13-*i*. Further, in FIG. 6, the same reference characters as those in FIG. 1 designate similar components.

The VOAs 14*a-i*, 14*b-i* may be constituted by MZIs for controlling the difference in the optical path length between lights propagating through the branch waveguides by utilizing refractive index changes caused by the heater heating, similar to the aforementioned optical switches 13B-*i* illustrated in FIG. 3, in principle.

With the optical device 10A configured as described above, there is provided an advantage that it is possible to realize a wavelength selective optical switch having the function of an AGEQ for adjusting and equalizing the light intensity levels of respective wavelengths while reducing the number of AWGs used as device components and significantly reducing the device size as compared with the prior art.

(C) Description of a Second Embodiment

FIG. 7(*a*) is a schematic view illustrating an optical device according to the second embodiment of the present invention. The optical device 20 illustrated in FIG. 7 can operate as a wavelength selective optical switch and is provided with two AWGs 21, 22 similar to that illustrated in FIG. 23(*a*) (see the reference character 1). The demultiplexing-side waveguides (second input/output waveguides) 217-1 to 217-N (N is a natural number of two or more) of the AWG 21 are connected to the demultiplexing-side waveguides (fourth input/output waveguides) 227-1 to 227-N of the AWG 22 through cantilever-type MEMS mirrors 23-1 to 23-N.

A first circulator 24 is connected to the multiplexing-side waveguide (first input/output waveguide) 213 of the AWG 21 and a third circulator 25 is connected to the multiplexing-side waveguide (third input/output waveguide) 223 of the AWG 22. In other words, the first circulator 24, the AWG 21, the cantilever-type MEMS mirrors 23-1 to 23-R, the AWG 22 and the second circulator 25 are arranged in cascade.

The AWG 21 functions as a first waveguide-type diffraction grating including a single first input/output waveguide 213 formed at its one end and N second input/output waveguides 217-1 to 217-N formed at the other end thereof, wherein the path from the first circulator 24 is connected to the first input/output waveguide 213. The AWG 22 functions as a second waveguide-type diffraction grating including a single third input/output waveguide 223 formed at its one end and N fourth input/output waveguides 227-1 to 227-N formed at the other end thereof, wherein the path from the second circulator 25 is connected to the third input/output waveguide 223.

The cantilever-type MEMS mirrors 23-1 to 23-N interposed between the demultiplexing-side waveguides 217-1 to 217-N and the demultiplexing-side waveguides 227-1 to 227-N function as transmitting/reflecting switches for switching over between the transmission and reflection of light propagating through the respective waveguides 217-1 to 217-N and 227-1 to 227-N.

Figure 7A:
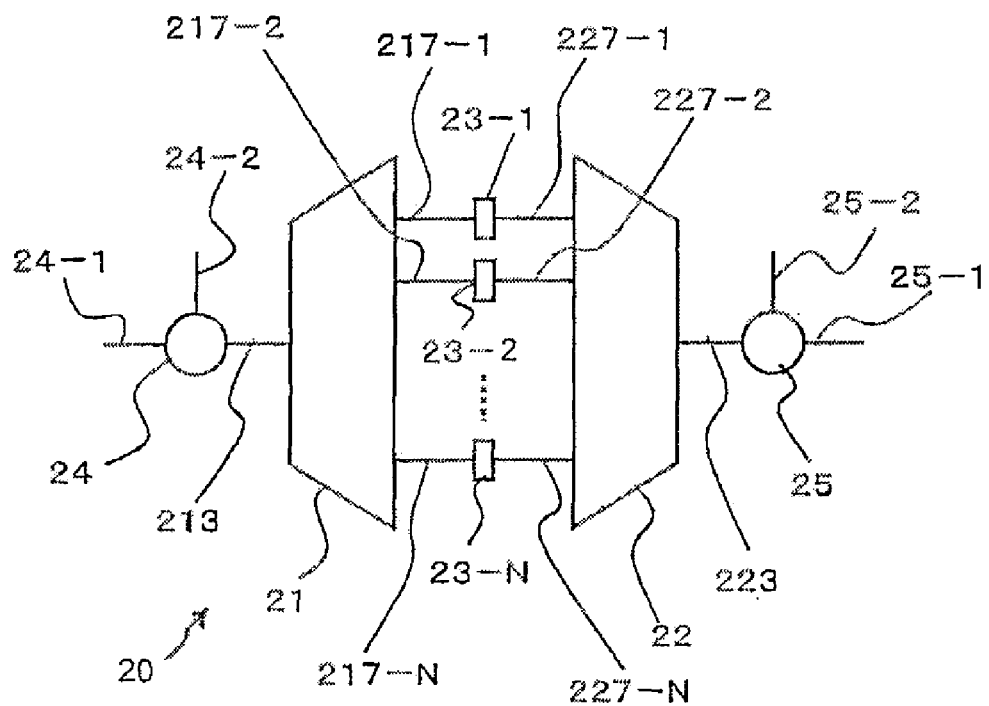
FIG. 7($a$) and FIG. 7($b$) are schematic views illustrating an optical device according to a second embodiment of the present invention.
Figure 7B:
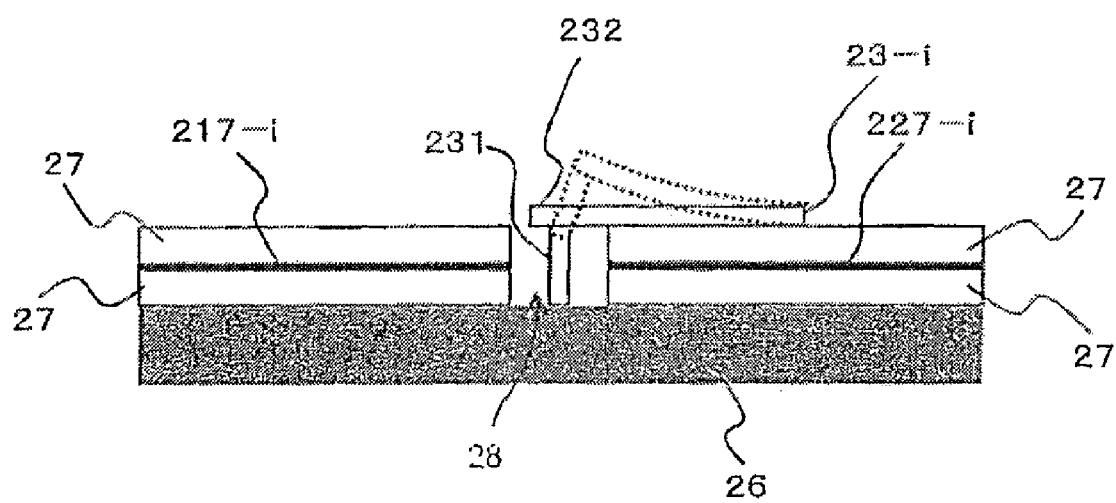

FIG. 7(b) is a view illustrating a schematic view for explaining the operation of the aforementioned cantilever-type MEMS mirror 23-$i$ (i is a natural number within the range of 1 to N) and is a front cross sectional view of the demultiplexing-side waveguides 217-$i$, 227-$i$ of the optical device 20 illustrated in FIG. 7(a). 27 is a clad layer surrounding the waveguides 217-$i$, 227-$i$.

As illustrated in FIG. 7(b), the cantilever-type MEMS mirror 23-$i$ is constituted by a double-sided mirror 231 and a bar 232, wherein an end portion of the mirror is attached to one end portion of the bar 232 and the other end portion of the bar 232 is attached to the clad layer 27 above the waveguides 217-$i$, 227-$i$.

Further, the mirror 231 is dropped within a slot-shaped space 28 provided between the two demultiplexing-side waveguides 217-$i$, 227-$i$. For example, under control by applying static electricity, the free end-portion (the portion to which the mirror 231 is attached) of the aforementioned bar 232 can be warped upwardly, thus lifting the mirror 231 from the slot-shaped space 28.

Consequently, when the mirror 231 is dropped within the slot-shaped space 28, the two demultiplexing-side waveguides 217-$i$, 227-$i$ are intercepted and light from the demultiplexing-side waveguide 217-$i$ is reflected by one side of the mirror 231 towards the original waveguide 217-$i$ while light from the demultiplexing-side waveguide 227-$i$ is reflected by the other side of the mirror 231 towards the original waveguide 227-$i$.

Also, when the mirror 231 is lifted from the slot-shaped space 28, the two demultiplexing-side waveguides 217-$i$, 227-$i$ are optically connected to each other and light from the demultiplexing-side waveguide 217-$i$ is propagated toward the waveguide 227-$i$ while light from the demultiplexing-side waveguide 217-$i$ is propagated towards the waveguide 217-$i$.

With the aforementioned configuration, in the optical device 20 according to the second embodiment of the present invention, the port 24-1 at the input side of the first optical circulator 24 may be utilized as an IN port, the port 25-1 at the input side of the second circulator 25 may be utilized as an add port, the port 24-2 at the output side of the first optical circulator 24 may be utilized as an OUT port and the port 25-2 at the output side of the second circulator 25 may be utilized as a drop port to configure a switch for performing ADM (Add/Drop Multiplexing) switching with a single PLC provided with two AWGs.

Namely, in order to output, from the OUT port 24-2, light with a predetermined wavelength out of wavelength-multiplexed light inputted from the IN port 24-1, the mirror 231 of the cantilever-type MEMS mirror 23-$i$ provided on an extended portion (terminating portion of the demultiplexing-side waveguide 227-$i$ for propagating a demultiplexed light) of the optical path for demultiplexed light with the pertinent wavelength is placed within the slot-shaped space 28 to cause the light with this wavelength to be reflected toward the demultiplexing-side waveguide 217-$i$. Consequently, the reflected light is outputted from the OUT port 24-2 through the multiplexing-side waveguide 213 and the first optical circulator 24.

Also, in order to output, from the drop port 25-2, light with a predetermined wavelength out of wavelength-multiplexed light inputted from the IN port 24-1, the mirror 231 of the cantilever-type MEMS mirror 23-$i$ provided on an extended portion of the optical path for demultiplexed light with the pertinent wavelength is lifted from the slot-shaped space 28 to cause the light with this wavelength to be outputted to the demultiplexing-side waveguide 227-$i$. The light outputted to the demultiplexing-side waveguide 227-$i$ is outputted from the drop port 25-2 through the multiplexing-side waveguide 233 and the second optical circulator 24. By similarly operating the cantilever-type MEMS mirror 23-$i$, light with a predetermined wavelength can be output from the add port 25-$i$ to the OUT port 24-2.

Also, both the ports 24-1, 25-1 may be utilized as an IN port and both the ports 24-2, 25-2 may be utilized as an OUT port to operate the optical device as a switch for performing wavelength cross connections with only a single PLC provided with two AWGs.

As described above, with the optical device 20 according to the second embodiment of the present invention, it is possible to configure a wavelength selective optical switch by employing the first and second optical circulators 24, 25, the two AWGs 21, 22 and the cantilever-type MEMS mirrors 23-1 to 23-N, thereby providing an advantage that it is possible to realize a wavelength selective optical switch with a reduced device size as compared with conventional configurations without requiring connections through optical fibers.

Particularly, it is possible to configure a wavelength selective optical switch by employing a single PLC (Planer Lightwave Circuit) provided with two AWGs and cantilever-type MEMS mirrors 23-1 to 23-N formed on the same substrate 26, thereby providing an advantage that it is possible to realize a wavelength-selection optical switch with a device size significantly reduced as compared with conventional configurations.

While in the optical device 20 illustrated in FIG. 7(a), each of the two AWGs 21, 22 includes a single multiplexing-side waveguide 213, 223 to configure a 2×2 wavelength selective optical switch, the present invention is not limited to this and the AWGs 21, 22 may include P multiplexing-side waveguides (P is a natural number of two or more) and Q multiplexing-side waveguides (Q is a natural number of two or more), respectively, to configure a wavelength selective optical switch having two or more input/output ports.

Also, the transmitting/reflecting switches for switching over between the transmission and reflection of light propagating through the respective waveguides 217-1 to 217-N and 227-1 to 227-N may be other switches other than cantilever-type MEMS mirrors 23-1 to 23-N.

(c1) Description of Exemplary Modifications of the Second Embodiment

Figure 8:
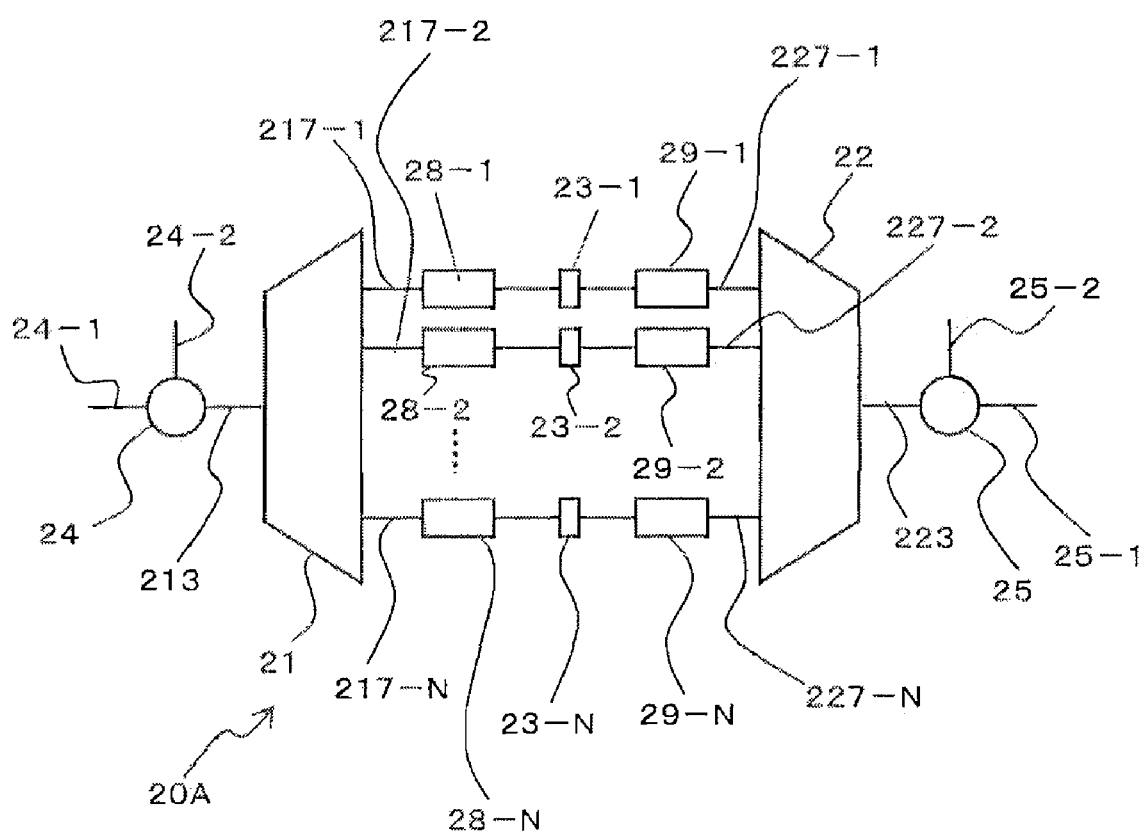
FIG. 8 is a schematic view illustrating the optical device according to an exemplary modification of the second embodiment of the present invention.

FIG. 8 is a schematic view illustrating an optical device 20A according to an exemplary modification of the second embodiment of the present invention. The optical device 20A illustrated in FIG. 8 is different from the aforementioned optical device 20A illustrated in FIG. 7(a) in that there are interposed variable optical attenuators (VOA) 28-1 to 28-N and 29-1 to 29-N for variably controlling the intensity of propagating light, on the demultiplexing-side waveguides 217-1 to 217-N of the AWG 21 and on the demultiplexing-side waveguides 227-1 to 227-N of the AWG 22. Further, in FIG. 8, the same reference characters as those in FIG. 7 designate similar components.

The VOAs 28-1 to 28-N and 29-1 to 29-N may be constituted by MZIs for controlling the difference in the optical path length between lights propagating through branch waveguides by utilizing refractive index changes caused by heater heating, similarly to the aforementioned optical switches 13B-1 to 13B-N illustrated in FIG. 3, in principle.

With the optical device 20A configured as described above, there is provided an advantage that it is possible to realize a wavelength selective optical switch having the function of an AGEQ for adjusting and equalizing the light-intensity levels of respective wavelengths while significantly reducing the device size.

While the aforementioned VOAs 28-1, 28-N are provided on the demultiplexing-side waveguides 217-1 to 217-N, they may be provided at least on the portion between the AWG 21 and the cantilever-type MEMS mirrors 23-1 to 23-N for propagating demultiplexed light, in the present invention, and also the VOA 29-1 to 29-N may be provided at least on the portion between the AWG 22 and the cantilever-type MEMS mirrors 23-1 to 23-N for propagating demultiplexed light.

(d) Description of a Third Embodiment

Figure 9:
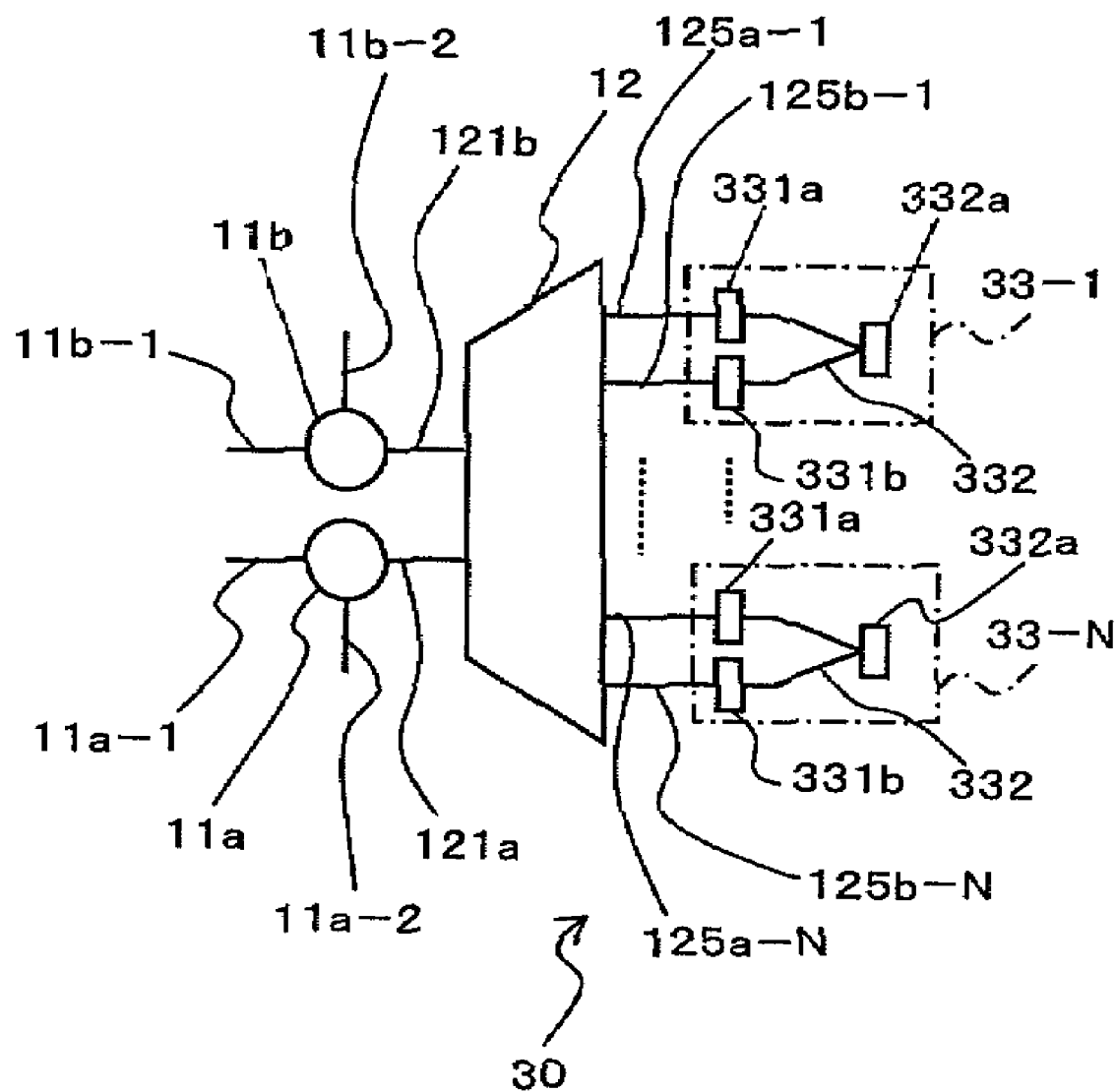
FIG. 9 is a schematic view illustrating an optical device according to a third embodiment of the present invention.

FIG. 9 is a schematic view illustrating an optical device according to the third embodiment of the present invention. The optical device 30 illustrated in FIG. 9 is different from the aforementioned optical device 10 according to the aforementioned first embodiment in that optical switches 33-1 to 33-N employing cantilever-type MEMS mirrors 331a, 331b are utilized as the reflection-type optical switches 13-1 to 13-N and other configurations are basically the same. Further, in FIG. 9, the same reference characters as those in FIG. 1 designate similar components.

The reflection-type optical switch 33-i (i is an arbitrary natural number within the range of from 1 to N) is constituted by an optical circuit 332 for folding back light from one of (adjacent two) second input/output waveguides 125a-i125b-i such that the light is directed to the other waveguide, the second input/output waveguides 125a-i125b-i being capable of propagating demultiplexed lights with the same wavelength, and two cantilever-type MEMS switches 331a, 331b for switching over between the transmission and the reflection of light propagating through the adjacent two second input/output waveguides 125a-i125b-i.

The optical circuit 332 illustrated in FIG. 9 is configured to include a reflective mirror 332a and the two adjacent second input/output waveguides 125a-i125b-i are configured such that light from one of the second input/output waveguides 125a-i125b-i is reflected by the reflective mirror 332a and directed to the other waveguide. However, the adjacent two second input/output waveguides 125a-i125b-i maybe (bypass) connected to each other using a bent waveguide, etc.

With the aforementioned configuration, in the optical device 30 according to the third embodiment of the present invention, the port 11b-1 at the input side of the optical circulator 11b may be utilized as an IN port, the port 11a-1 at the input side of the optical circulator 11a may be utilized as an add port, the port 11b-2 at the output side of the optical circulator 11b may be utilized as an add port, and the port 11a-2 at the output side of the optical circulator 11a may be utilized as a drop port to configure a switch for performing ADM (Add/Drop Multiplexing) switching with a single AWG.

Namely, in order to output, from the OUT port 11b-2, light with a predetermined wavelength out of wavelength-multiplexed light inputted from the IN port 11b-1, the cantilever-type MEMS mirrors 332a, 332b in the optical switch 33-i for switching over the optical path for the pertinent wavelength are placed within a slot-type space, not shown, to cause light with this wavelength which has been propagated from the demultiplexing-side waveguide 125b-i to be reflected towards the demultiplexing-side waveguide 125b-i. Consequently, the reflected light is outputted from the OUT port 11b-2 through the multiplexing-side waveguide 121b and the optical circulator 11b.

Also, in order to output, from the drop port 11b-2, light with a predetermined wavelength out of wavelength-multiplexed light inputted from the IN port 11b-1, the cantilever-type MEMS mirrors 332a, 332b in the optical switch 33-i for switching over the optical path for the pertinent wavelength are lifted from the slot-type space, not shown, to cause light with this wavelength which has been propagated from the demultiplexing-side waveguide 125b-i to be output to the demultiplexing-side waveguide 125a-i. The light outputted to the demultiplexing-side waveguide 125a-i is outputted from the drop port 11a-2 through the multiplexing-side waveguide 121a and the optical circulator 11a.

Further, by similarly controlling the cantilever-type MEMS mirrors 332a, 332b in the optical switch 33-i light with a predetermined wavelength can be output from the add port 11a-1 to the OUT port 11b-2.

As described above, with the optical device according to the third embodiment of the present invention, it is possible to configure a wavelength selective optical switch with a single AWG, thereby providing an advantage that it is possible to realize a wavelength selective optical switch with a reduced device size without requiring connections through optical fibers, etc., in the switch, while reducing the number of AWGs utilized as device components as compared with the prior art.

(d1) Description of Exemplary Modifications of the Third Embodiment

Figure 10:
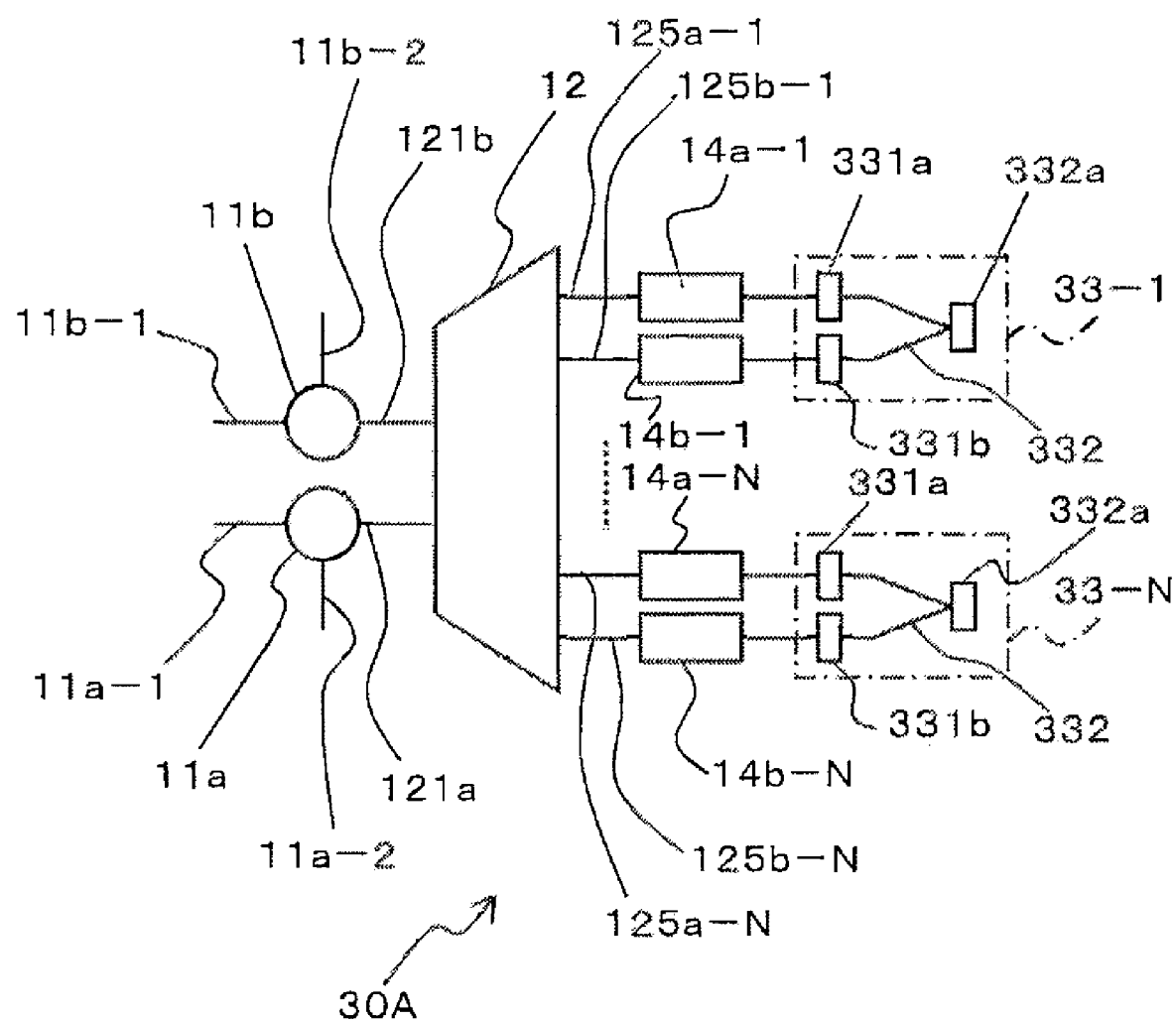
FIG. 10 is a schematic view illustrating the optical device according to an exemplary modification of the third embodiment of the present invention.

FIG. 10 is a schematic view illustrating an optical device 30A according to an exemplary modification of the third embodiment of the present invention. The optical device 30A illustrated in FIG. 10 is different from the aforementioned optical device 30 illustrated in FIG. 9 in that there are interposed variable optical attenuators (VOA) 14a-i 14b-i for variably controlling the intensity of propagating light, between the second input/output waveguides 125a-i 125b-i of the AWG 12 and the reflection-type optical switches 33-i. Further, in FIG. 10 the same reference characters as those in FIG. 9 designate similar components.

The VOAs 14a-i 14b-i may be constituted by MZIs for controlling the difference in the optical path length between lights propagating through the branch waveguides by utilizing refractive index differences caused by heater heating, similarly to the aforementioned optical switches 13B-*i* illustrated in FIG. 6.

With the optical device 30A configured as described above, there is provided an advantage that it is possible to realize a wavelength selective optical switch having the function of an AGEQ for adjusting and equalizing the light-intensity levels of respective wavelengths while reducing the number of AWGs utilized as device components and significantly reducing the device size as compared with the prior art.

(e) Description of a Fourth Embodiment

Figure 11:
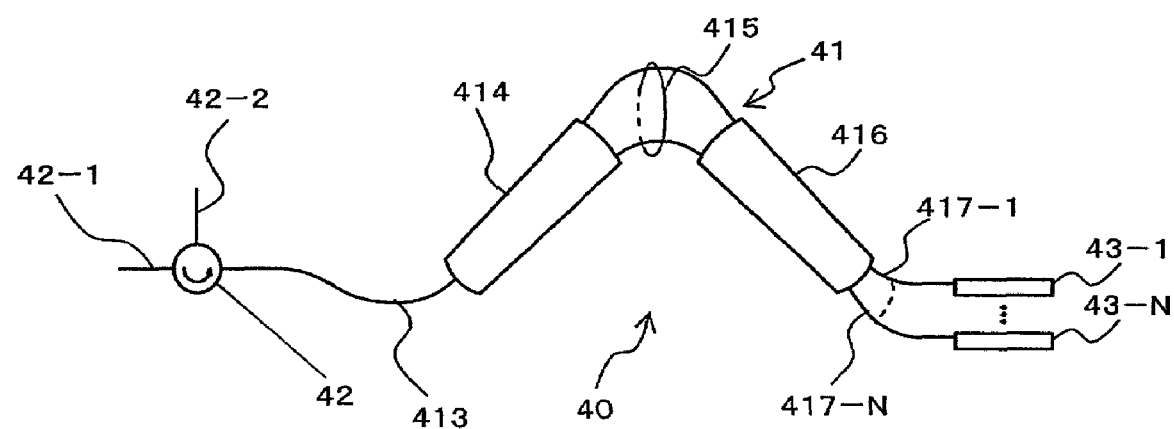
FIG. 11 is a schematic view illustrating an optical device according to a fourth embodiment of the present invention.

FIG. 11 is a schematic view illustrating an optical device according to the fourth embodiment of the present invention. The optical device 40 illustrated in FIG. 11 can operate as an optical level adjusting device and is provided with an AWG 41 similar to that illustrated in FIG. 23(*a*). An optical circulator 42 is connected to a multiplexing-side waveguide [a first input/output waveguide, see the reference character 3 in FIG. 23(*a*)] 413 formed at one end of the AWG 41 and reflected-light intensity adjusting devices 43-1 to 43-N are connected to a demultiplexing-side waveguide [a second input/output waveguide, see the reference characters 7-1 to 7-N in FIG. 23(*a*)] 417-1 to 417-N formed at the other end of the AWG 41.

In the AWG 41, 414 is a slab waveguide corresponding to the reference character 4 in FIG. 23(*a*), 415 is channel waveguides corresponding to the reference character 5 in the same figure and 416 is a slab waveguide corresponding to the reference character 6 in the same figure.

Namely, the optical circulator 42 capable of functioning as an input/output port, the AWG 41 and the N reflected-light intensity adjusting devices 43-1 to 43-N are arranged in cascade.

Figure 12:
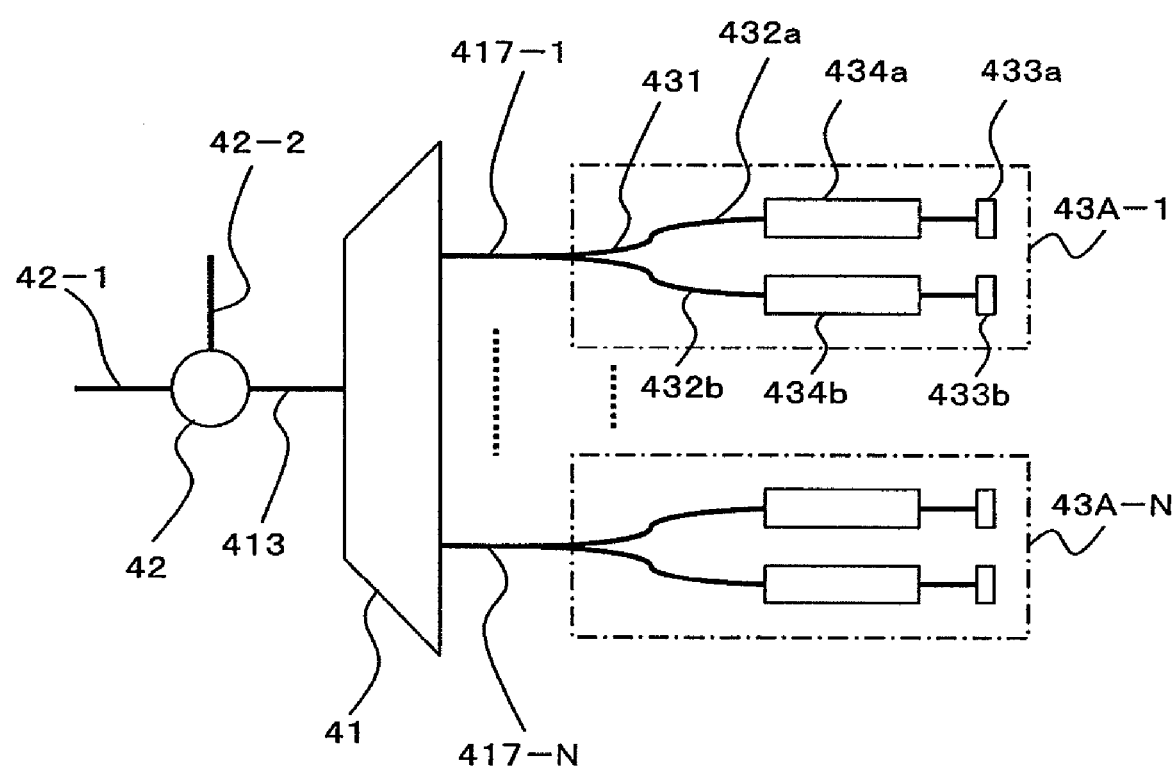
FIGS. 12 to 14 are schematic views illustrating main parts of the optical device according to the fourth embodiment of the present invention.
Figure 13:
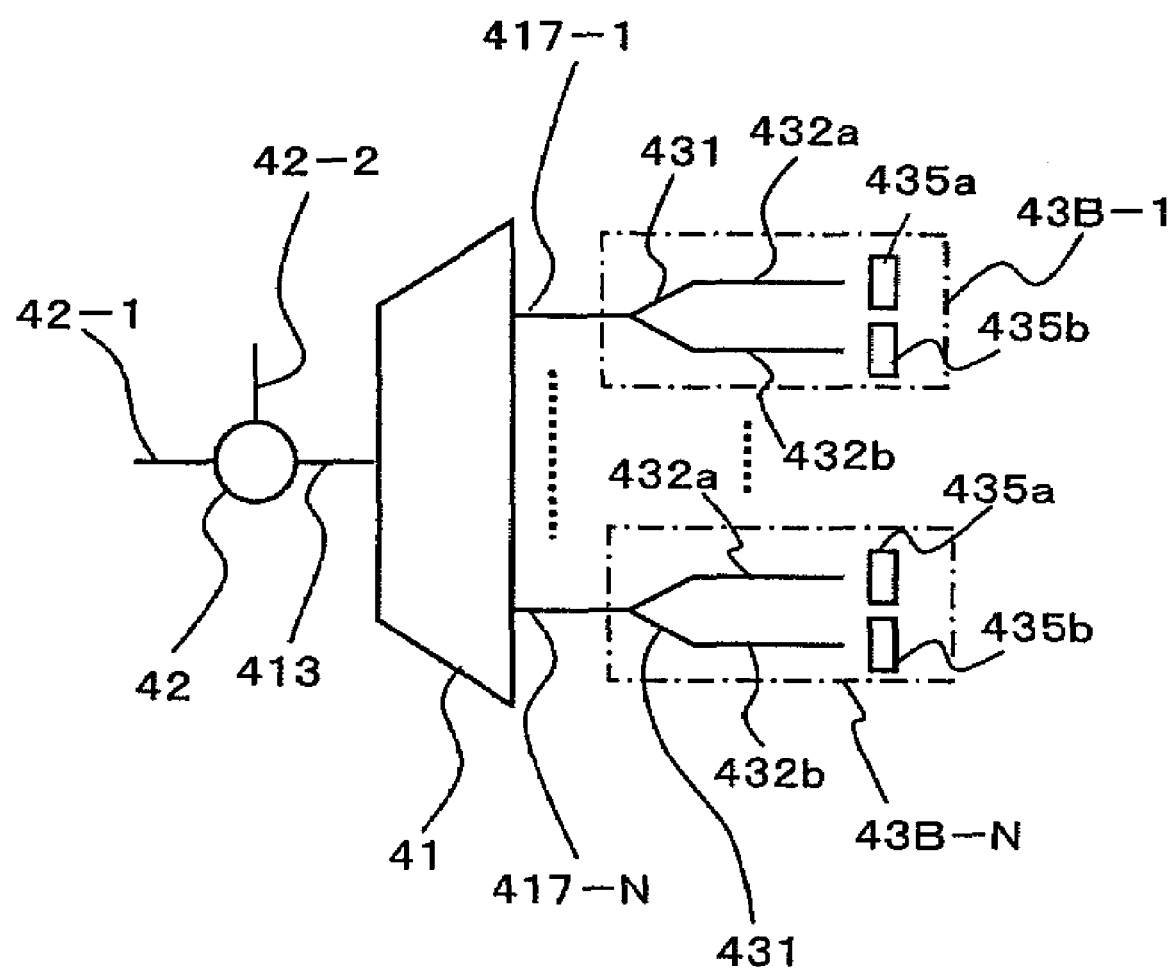
Figure 14:
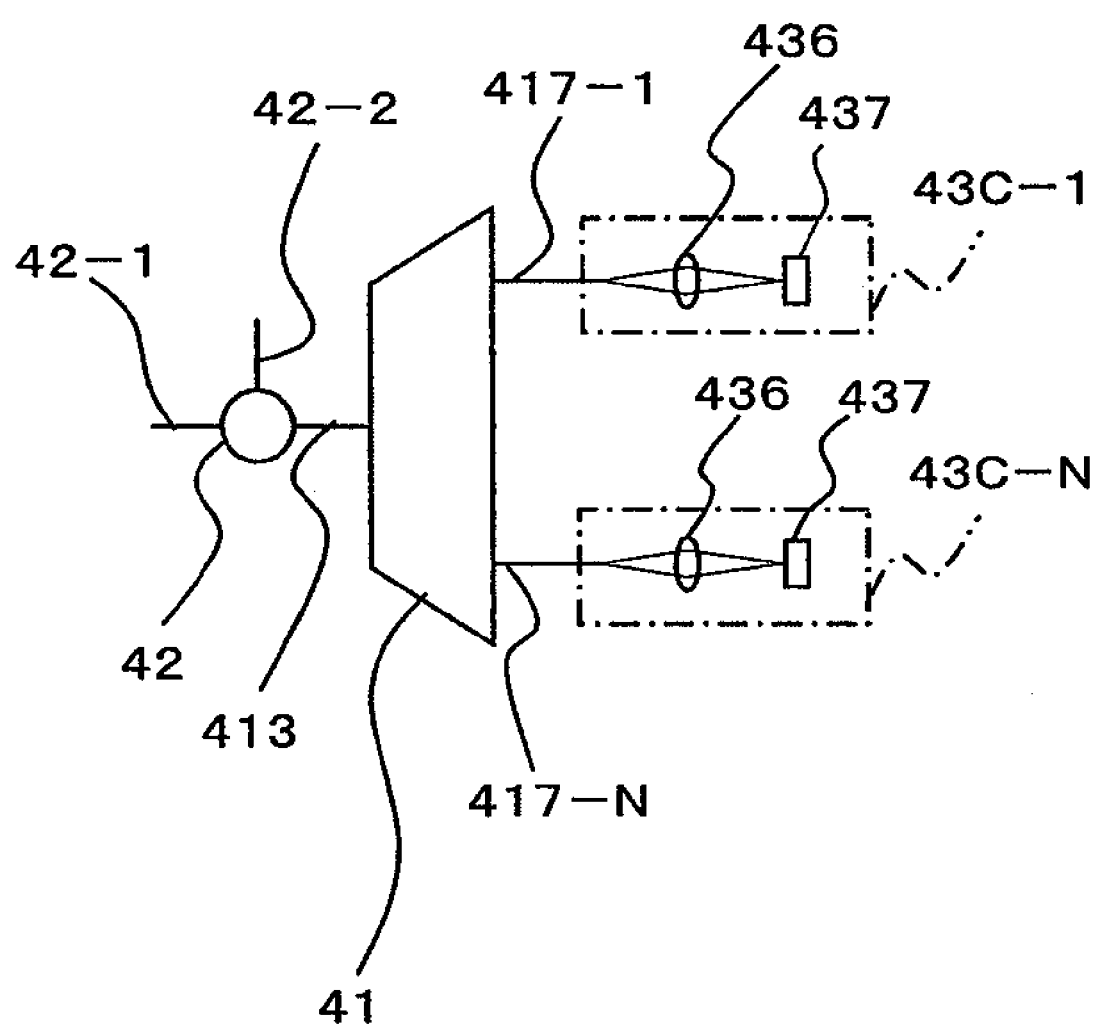

Further, the reflected-light intensity adjusting devices 43-1 to 43-N function as light-intensity adjusting circuits capable of reflecting light from the demultiplexing-side waveguides 417-1 to 417-N and adjusting the light intensity of the reflected light and may be configured according to aspects illustrated in FIG. 12 to FIG. 14.

Namely, as a configuration according to the first aspect, as illustrated in FIG. 12, the reflected-light-intensity adjusting devices 43-1 to 43-N maybe reflection-type MZIs (Mach-Zehnder interferometers) 43A-1 to 43A-N formed integrally with the PLC forming the AWG 41.

The reflection-type MZIs 43A-1 to 43A-N have the same configuration. In focusing attention on the reflection-type MZI 43A-1 corresponding to the reflected-light intensity adjusting device 43-1, the reflection-type MZI 43A-1 is constituted by a dividing waveguide 431, two branch waveguides 432*a*, 432*b*, reflective members 433*a*, 433*b* and heaters 434*a*, 434*b*.

Namely, the dividing waveguide 431 in the MZI 43A-1 divides or branches the demultiplexing-side waveguide 417-1 into two paths, and the two branch waveguides 432*a*, 432*b* are connected at their ends to the paths divided into two by the dividing waveguide 431. The reflective members 433*a*, 433*b* are formed at the other ends of the respective branch waveguides 432*a*, 432*b* and reflect light propagated thereto through the branch waveguides 432*a*, 432*b*.

Further, the heaters 434*a*, 434*b* are capable of adjusting, by utilizing a thermo-optic effect, the difference in the optical path length between lights propagating through the respective branch waveguides 432*a*, 432*b*. There may be provided electrodes (see the reference character 133B) for supplying a voltage for the heating control to the heaters 434*a*, 434*b*. Also, there may be provided thermal-insulating slots between the branch waveguides 432*a*, 432*b* for preventing the heating controls for the two heaters 434*a*, 434*b* from affecting each other.

Consequently, the reflected lights propagating through the respective branch waveguides 432*a*, 432*b* having a phase difference therebetween adjusted by the heaters 434*a*, 434*b* interfere with each other and are multiplexed in the dividing waveguide 431. Namely, by adjusting, with the heaters 434*a*, 434*b*, the phase difference between the reflected lights before being multiplexed, the level of the multiplexed light can be adjusted.

Therefore, with the reflection-type MZIs 43A-1 to 43A-N as the first aspect of the reflected-light intensity adjusting devices 43-1 to 43-N, the phases of reflected lights can be adjusted utilizing a thermo-optic effect to adjust the levels of reflected lights propagating through the demultiplexing-side waveguides 417-1 to 417-N in the AWG 41.

Also, as a configuration according to the second aspect, as illustrated in FIG. 13, the reflected-light-intensity adjusting devices 43-1 to 43-N may be reflection-type MZIs (Mach-Zehnder interferometers) 43B-1 to 43B-N.

The reflection-type MZIs 43B-1 to 43B-N have the same configuration. In focusing attention on the reflection-type MZI 43B-1 corresponding to the reflected-light intensity adjusting device 43-1, the reflection-type MZI 43B-1 is constituted by a dividing waveguide 431 and two branch waveguides 432*a*, 432*b* similar to those in the aforementioned MZI 43A-1, reflective members 435*a*, 435*b* which are different from those in the aforementioned MZI 43A-1 (see the reference characters 433*a*, 433*b*).

The reflective members 435*a*, 435*b* are formed at the other ends of the branch waveguides 432*a*, 432*b*, respectively, and these reflective members 435*a*, 435*b* are constituted by piston-operation type mirrors similar to the reference character 132C in FIG. 4.

The piston-operation-type mirrors 435*a*, 435*b* are configured such that the surfaces of the mirrors 435*a*, 435*b* can be moved, by external control, forward and rearward in parallel with the optical paths, causing differences in the optical path length between lights traveling through the two branch waveguides 432*a*, 432*b*. In other words, the piston-operation type mirrors 435*a*, 435*b* are configured such that the difference in the optical path length between the mirrors 435*a*, 435*b* and the dividing waveguide 431 can be adjusted.

Consequently, the reflected lights propagating through the respective branch waveguides 432*a*, 432*b* having a phase difference therebetween adjusted by the piston-operation type mirrors 435*a*, 435*b* interfere and are multiplexed in the dividing waveguide 431. Namely, by adjusting the difference in the optical path length between reflected lights before being multiplexed with the piston-operation-type mirrors 435*a*, 435*b*, the level of the multiplexed light can be adjusted.

Therefore, with the reflection-type MZIs 43B-1 to 43B-N as the second aspect of the reflected-light intensity adjusting devices 43-1 to 43-N, the difference in the optical path length of reflected lights can be adjusted by using the piston-operation-type mirrors 435*a*, 435*b* to adjust the levels of reflected lights propagating through the demultiplexing-side waveguides 417-1 to 417-N in the AWG 41.

Further, as a configuration according to the third aspect, as illustrated in FIG. 14, the reflected-light intensity adjusting devices 43-1 to 43-N may be lens mirror mechanisms 43C-1 to 43C-N.

The lens mirror mechanisms 43C-1 to 43C-N have the same configuration. In focusing attention on the lens mirror mechanisms 43C-1 corresponding to the reflected-light intensity adjusting device 43-1, the lens mirror mechanisms 43C-1 is constituted by a lens 436 and a small-angle variable mirror (tilt mirror) 437 such as an MEMS mirror, etc.

The lens 436 is capable of condensing light emitted from the PLC end face provided with the demultiplexing-side waveguides 417-1 to 417-N constituting the AWG 41 and light condensed by the lens 436 is input to the mirror 437. In other words, the lens 436 in the lens mirror mechanism 43C-1 optically couples light emitted from the demultiplexing-side waveguide 417-1 to the tilt mirror 437.

The mirror 437 reflects light emitted from the lens 436 and is configured such that the reflective surface level can be adjusted in terms of the angle, thereby enabling varying the amount of light reflected toward the lens 436 out of light inputted from the lens 436. The tilt mirror 437 is generally constituted by an array of integrated mirrors.

Therefore, with the lens mirror mechanisms 43C-1 to 43C-N as the third aspect of the reflected-light intensity adjusting devices 43-1 to 43-N, the levels of reflected lights propagating through the demultiplexing-side waveguides 417-1 to 417-N in the AWG 41 can be adjusted by adjusting the amount of reflected light through the adjustment of the reflective surface of the tilt mirror 437.

In the optical device 40 configured as described above, wavelength-multiplexed light from the input port 42-1 connected to the optical circulator 42 is divided in terms of the wavelength in the AWG 41 and lights with the respective wavelengths are propagated through the demultiplexing-side waveguides 417-1 to 417-N. The respective reflected-light intensity adjusting devices 43-1 to 43-N reflect light from the demultiplexing-side waveguides 417-1 to 417-N and also adjust the levels of the reflected lights to equalize the light intensities of respective wavelengths. Thus, the lights having equalized wavelength components are multiplexed at the AWG 41 and output from the output port 42-2 through the multiplexing-side waveguide 413 and the optical circulator 42.

As described above, with the optical device 40 according to the fourth embodiment of the present invention, an optical level adjusting device can be configured by employing only a single AWG 41. This provides an advantage that it is possible to configure optical level adjusting device with device size significantly reduced as compared with the prior art.

(f) Description of a Fifth Embodiment

Figure 15:
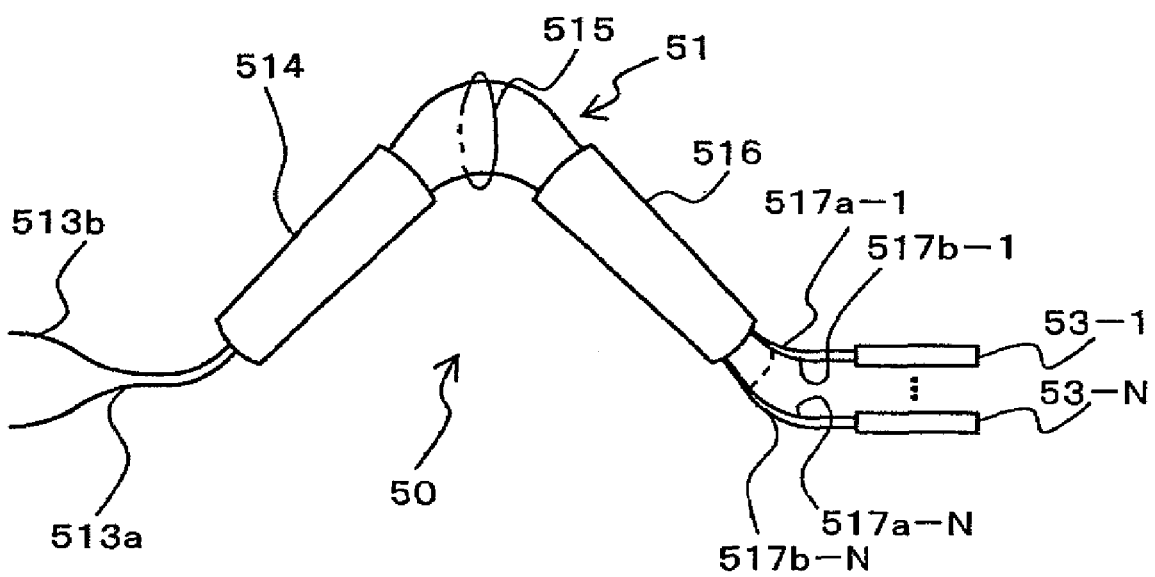
FIG. 15 is a schematic view illustrating an optical device according to a fifth embodiment of the present invention.

FIG. 15 is a schematic view illustrating an optical device 50 according to the fifth embodiment of the present invention. The optical device 50 illustrated in FIG. 15 can operate as an optical level adjusting device and is provided with an AWG 51 similar to that illustrated in FIG. 23(b).

The AWG 51 is provided, at its one end, with a multiplexing-side waveguide 513b as an input waveguide and a multiplexing-side waveguide 513a as an output waveguide [see the reference characters 3b, 3a in FIG. 23(b)], the multiplexing-side waveguide 513b and the multiplexing-side waveguide 513a being in parallel with each other. Further, the AWG 51 is provided, at the other end thereof, demultiplexing-side waveguides [2×N input/output waveguides, see the reference characters 7a-1 to 7a-N and 7b-1 to 7b-N in FIG. 23(b)] 517a-1 to 517a-N and 517b-1 to 517b-N, wherein a reflected-light intensity adjusting device 53-i is connected to every two adjacent demultiplexing-side waveguides 7a-i7b-i.

In the AWG 51, 514 is a slab waveguide corresponding to the reference character 4 in FIG. 23(b), 515 is channel waveguides corresponding to the reference character 5 in the same figure and 516 is a slab waveguide corresponding to the reference character 6 in the same figure. Namely, the AWG 51 and the N reflected-light intensity adjusting devices 53-1 to 53-N are arranged in cascade.

The reflected-light intensity adjusting devices 53-1 to 53-N function as light-intensity adjusting circuits for adjusting the light intensity of light from the demultiplexing-side waveguide 517b-1 to 517b-N as one input/output waveguide and for reflecting back the light having the adjusted light intensity towards the demultiplexing-side waveguide 517a-l to 517a-N as the other input/output waveguide. For example, the reflected-light intensity adjusting devices 53-1 to 53-N may be configured according to aspects illustrated in FIG. 16 and FIG. 17, which will be described later.

Figure 16:
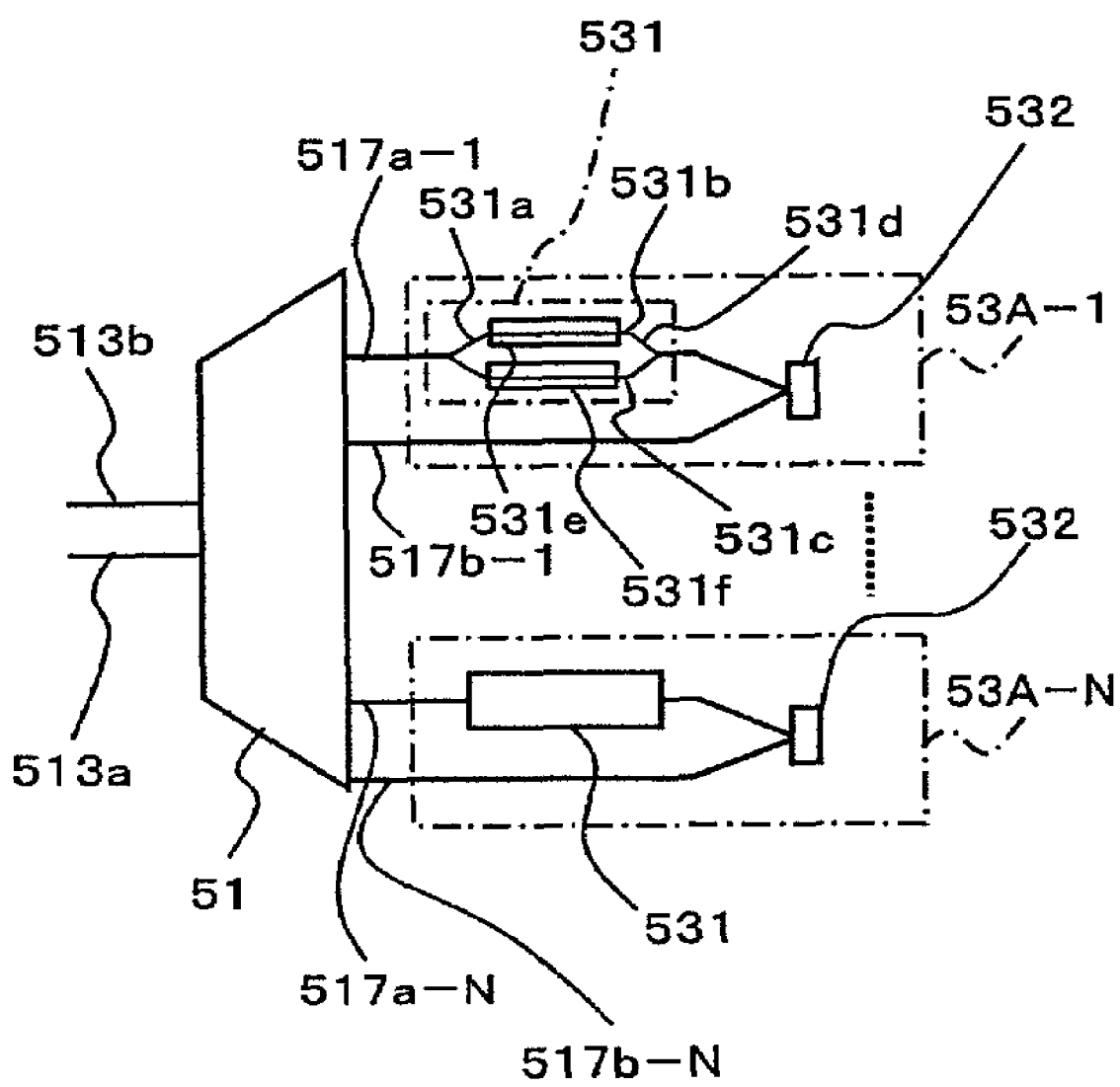
FIG. 16 and FIG. 17 are schematic views illustrating main parts of the optical device according to the fifth embodiment of the present invention.

Namely, as a configuration according to a first aspect, as illustrated in FIG. 16, the reflected-light intensity adjusting devices 53-1 to 53-N may be light-intensity adjusting circuits each constituted by an MZI (Mach-Zehnder interferometer) 531 and a mirror 532. The light-intensity adjusting circuits 53A-1 to 53A-N have the same configuration and, hereinafter, the configuration will be described in focusing attention on the light-intensity adjusting circuit 53A-1 corresponding to the reflected-light intensity adjusting device 53-1.

The MZI 531 constituting the light-intensity adjusting circuit 53A-1 is capable of adjusting the difference in the optical path length between the branches for demultiplexed light propagated through the demultiplexing-side waveguide 517b-1 constituting the AWG 51 and is constituted by a dividing waveguide 531a, two branch waveguides 531b, 531c, a multiplexing-side waveguide 531d and heaters 531e, 531f.

Namely, the dividing waveguide 531a in the MZI 531 divides or branches demultiplexed light propagated thereto through the demultiplexing-side waveguide 517b-1 into two paths and the two branch waveguides 531b, 531c are connected at their ends to the two divided paths created by the dividing waveguide 531a. The multiplexing-side waveguide 531d multiplexes lights propagating through the branch waveguides 531b, 531c into light propagating through a single waveguide 517b-1.

The heaters 531e, 531f are capable of adjusting the difference in the optical path length between respective lights propagating through the respective branch waveguides 531b, 531c by utilizing a thermo-optic effect. For example, similarly to those illustrated in FIG. 3, there may be provided electrodes (see the reference character 133B) for supplying a voltage for the heating control to the heaters 531e, 531f and also there may be formed heat insulating slots between the branch waveguides 531b, 531c for preventing the heating controls for the two heaters 531e, 531f from affecting each other.

Consequently, the reflected lights propagating through the respective branch waveguides 531b, 531c and having a phase difference therebetween adjusted by the heaters 531e, 531f interfere and are multiplexed in the dividing waveguide 531d. Namely, by adjusting the phase difference between the reflected lights before being multiplexed through the heaters 531e, 531f, the level of the multiplexed light can be adjusted.

The mirror 532 reflects light with a light intensity adjusted by the MZI 531 towards the demultiplexing-side waveguide 517a-1 and constitutes an optical circuit for folding back light from one demultiplexing-side waveguide 517b-1 (which propagates light from the input waveguide 513a) out of the adjacent demultiplexing-side waveguides 517a-1, 517b-1 such that the light is directed to the other demultiplexing-side waveguide 517a-1 (which forms a optical path for outputting light from the output waveguide).

Therefore, with the light-intensity adjusting circuits 53A-1 to 53A-N as the first aspect of the reflected-light intensity adjusting devices 53-1 to 53-N, the phases of reflected lights can be adjusted by utilizing a thermo-optic effect to adjust the levels of respective wavelengths constituting output light in the AWG 51.

While the aforementioned MZI 531 is placed to adjust the intensity of demultiplexed light before being reflected by the mirror 532, it may be placed to adjust the intensity of the reflected light after reflected by the mirror 532.

Figure 17:
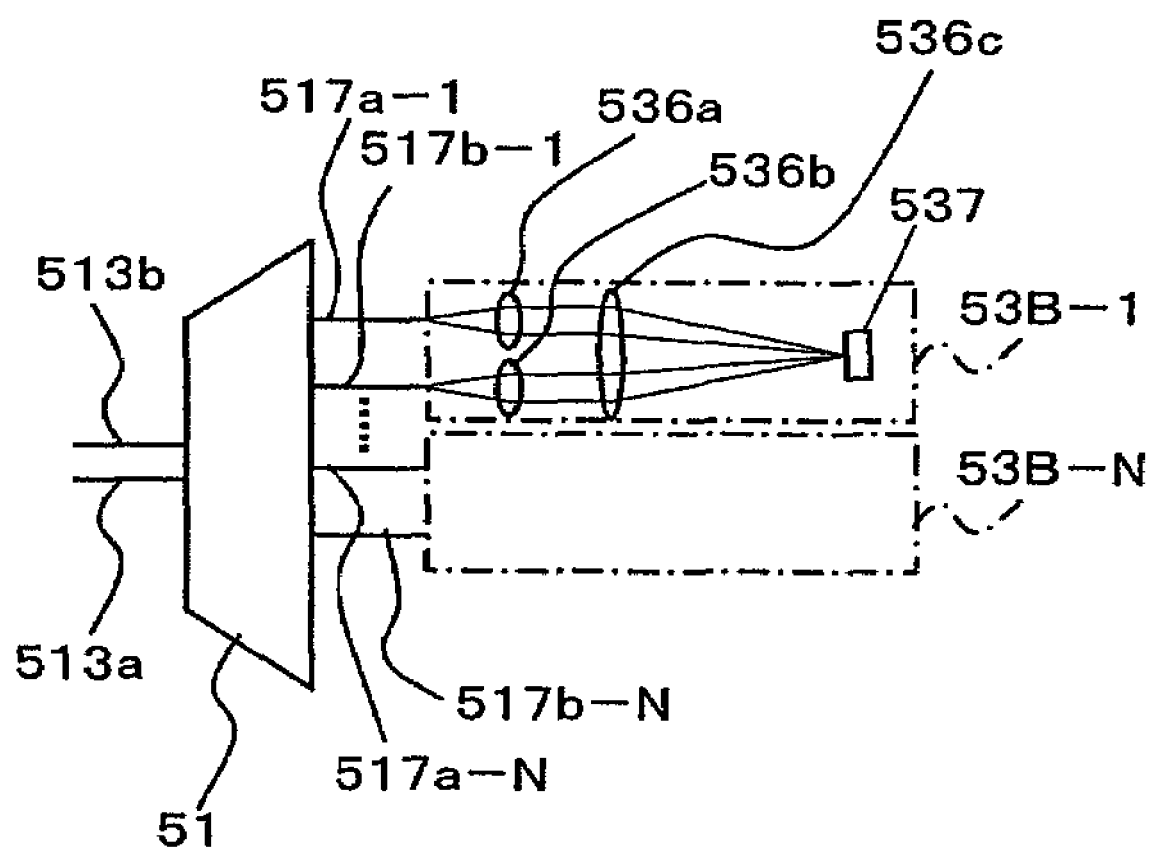

Further, as a configuration according to a second aspect, as illustrated in FIG. 17, the reflected-light intensity adjusting devices 53-1 to 53-N may be lens mirror mechanisms 53B-1 to 53B-N.

The lens mirror mechanisms 53B-1 to 53B-N have the same configuration. In focusing attention on the lens mirror mechanisms 53B-1 corresponding to the reflected-light intensity adjusting device 53-1, the lens mirror mechanisms 53B-1 is constituted by lenses 536a to 536c and a small-angle variable mirror (tilt mirror) 537 such as an MEMS mirror.

The lens 536b is capable of collimating light emitted from the PLC end face provided with the demultiplexing-side waveguides 517b-1, into parallel light, and the lens 536c condenses the light collimated by the lens 536b such that it is focused on the surface of the small-angle variable mirror 537 and also condenses reflected light from the mirror 537 into parallel light.

The mirror 537 reflects light emitted from the lens 536c and is configured such that the reflective surface level can be adjusted in terms of the angle, thereby enabling varying the amount of light reflected toward the lens 536c out of light inputted from the lens 536c. The tilt type mirror 537 is generally constituted by an array of integrated mirrors.

The lens 536a condenses the reflected light which has been condensed by the lens 536c such that it is focused on the surface of the PLC end face provided with the input/output waveguide 517a-1. In other words, the lenses 536a to 536c in the lens mirror mechanism 53B-1 optically couple the AWG 51 to the tilt mirror 537.

Therefore, with the lens mirror mechanisms 53C-1 to 53C-N as the third aspect of the reflected-light intensity adjusting devices 53-1 to 53-N, the reflective surface levels of the tilt mirrors 537 can be adjusted to adjust the amount of reflected light, thereby enabling adjusting the levels of reflected lights propagating through the demultiplexing-side waveguides 517-1 to 517-N in the AWG 51.

In the optical device 50 configured as described above, wavelength-multiplexed light from the input port 513b is separated in terms of the wavelength in the AWG 51 and the lights with the respective wavelengths are propagated through the demultiplexing-side waveguides 517b-1 to 517b-N. The respective reflected-light intensity adjusting devices 53-1 to 53-N reflect light from the demultiplexing-side waveguides 517b-1 to 517b-N and adjust the level of the light to equalize the light intensities of respective wavelengths propagating through the demultiplexing-side waveguides 517a-1 to 517a-N. Thus, the lights having equalized wavelength components are multiplexed at the AWG 51 and output from the output port 42-2 through the multiplexing-side waveguide 413 and the optical circulator 42.

As described above, with the optical device 50 according to the fifth embodiment of the present invention, an optical level adjusting device can be configured by employing only a single AWG 51. This provides an advantage that it is possible to configure an optical level adjusting device with a device size significantly reduced as compared with the prior art.

(g) Description of a Sixth Embodiment

Figure 18:
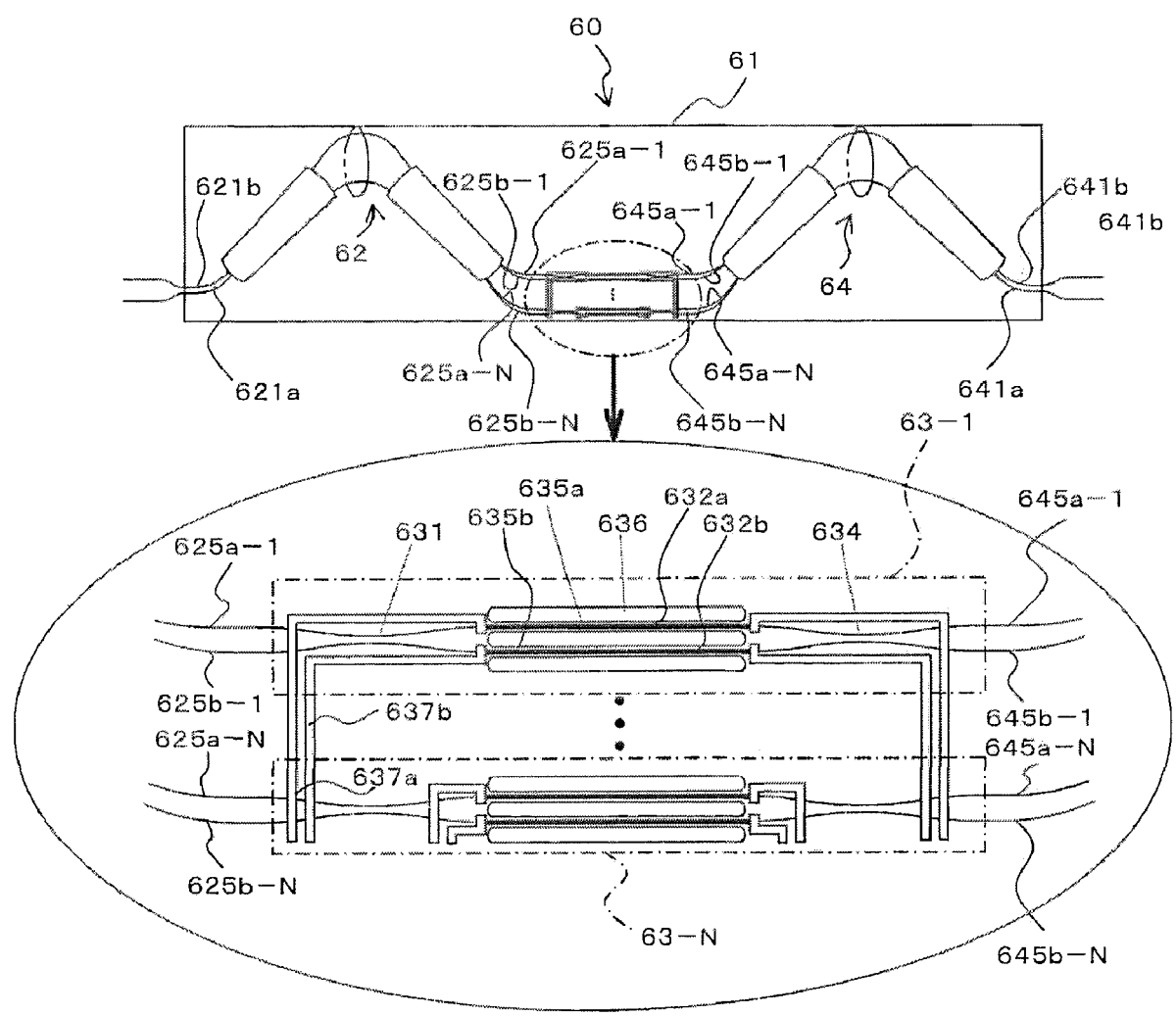
FIG. 18 is a schematic view illustrating an optical device according to a sixth embodiment of the present invention.

FIG. 18 is a schematic view illustrating an optical device 60 according to the sixth embodiment of the present invention. The optical device 60 illustrated in FIG. 18 can operate as a wavelength selective switch and includes AWGs 62, 64 similar to that illustrated in FIG. 23(b) placed in tandem and N reflection-type optical switches 63-1 to 63-N interposed between the AWGs 62, 64. Namely, the aforementioned AWG 62, the optical switches 63-1 to 63-N and the AWG 64 are arranged in cascade on a substrate 61.

In the AWG (first waveguide-type diffraction grating) 62 illustrated in FIG. 18, 621a, 621b are two input waveguides [see the reference characters 3a, 3b in FIG. 23(b)] and 625a-1 to 625a-N and 625b-1 to 625b-N are 2×N output waveguides [see the reference characters 7a-1 to 7a-N and 7b-1 to 7b-N in FIG. 23(b)]. Namely, wavelength-multiplexed light input through the input waveguides 621a, 621b can be branched and the demultiplexed lights can be propagated through the respective output waveguides 625a-1 to 625a-N and 625b-1 to 625b-N.

Further, the optical switch 63-i (i is an arbitrary natural number within the range of from 1 to N) is provided with two input paths and two output paths. Each adjacent two waveguides 625a-i 625b-i out of the aforementioned 2×N output waveguides 625a-1 to 625a-N and 625b-1 to 625b-N are connected to the aforementioned input paths, thus enabling switching over the output paths to which input light from the input paths is outputted and constituting a 2×2 optical switch. Further, the two output paths of the optical switch 63-i are connected to the input waveguides 645a-i 645b-i of the AWG 64.

In the AWG (second waveguide-type diffraction grating) 64, 645a-1 to 645a-N and 645b-1 to 645b-N are 2×N input waveguides [see the reference characters 7a-1 to 7a-N and 7b-1 to 7b-N in FIG. 23(b)] and 641a, 641b are two output waveguides [see the reference characters 3a, 3b in FIG. 23(b)]. Namely, demultiplexed lights input through the input waveguides 645a-1 to 645a-N and 645b-1 to 645b-N are multiplexed and the multiplexed light, as wavelength-multiplexed light, is propagated through the respective output waveguides 641a, 641b.

More specifically, the aforementioned optical switches 63-1 to 63-N are constituted by MZI-type optical switches as illustrated in FIG. 18. Further, the optical switches 63-1 to 63-N are configured to be single-direction MZIs, which are evolved from the aforementioned MZI 13B-1 to 13B-N according to the first embodiment.

The 2×2 optical switch 63-i illustrated in FIG. 18 is constituted by a directional coupler 631 with two inputs and two outputs, two branch waveguides 632a, 632b connected at their one ends to two paths from the directional coupler 131B, which are illustrated in the figure as upper and lower branch waveguides, a directional coupler 634 with two inputs and two outputs which are connected at its two input paths to the other ends of the branch waveguides 632a, 632b, heaters 635a, 635b for heating the individual branch waveguides 632a, 632b forming the aforementioned two paths, electrodes 637a, 637b for supplying a voltage for heating control to the heaters 635a, 635b.

The two output paths of the directional coupler 634 are connected to the corresponding adjacent two waveguides 641a-i 641b-i out of the 2×N input waveguides 641a-1 to 641a-N and 641b-1 to 641b-N in the AWG 64.

Further, there are provided thermal-insulating slots 636 between the branch waveguides 632*a*, 632*b* for preventing the heating controls for the two heaters 635*a*, 635*b* from affecting each other.

Consequently, with the 2×2 optical switch 63-*i* the phase difference between lights propagating through the branch waveguides 632*a*, 632*b* can be adjusted through the heating control for the heaters 635*a*, 635*b* through the electrodes 637*a*, 637*b* to selectively switch over the propagation-destination waveguide for light inputted from the output waveguides 625*a-i* 625*b-i* between the two input waveguides 645*a-i* 645*b*.

Consequently, the optical switches 63-1 to 63-N switch over the paths of respective wavelength components of wavelength-multiplexed light inputted from the input waveguides 621*a*, 621*b* in the AWG 62 and the respective wavelength components are output through the output waveguides 641*a*, 641*b* in the AWG 64, as wavelength-multiplexed light.

In the optical device 60 configured as described above, the input waveguides 621*a*, 621*b* may be utilized as an IN port and an add port, respectively, and the output waveguides 641*a*, 641*b* may be utilized as an OUT port and a drop port, respectively, to operate the optical device 60 as a switch for performing optical ADM switching.

As described above, with the optical device 60 according to the sixth embodiment of the present invention, it is possible to configure a wavelength selective optical switch by providing the first and second waveguide-type diffraction gratings 62, 64 and the optical switches 63-1 to 63-N, thus providing an advantage that connections through optical fibers, etc., can be eliminated and the device scale can be significantly reduced.

Particularly, it is possible to configure a wavelength selective optical switch by employing a single PLC provided with two AWGs 62, 64 and the optical switches 63-1 to 63-N formed on the same substrate, whereby there is provided an advantage that connections with optical fibers in the wavelength selective switch can be eliminated and the device scale can be significantly reduced.

While the optical switches 63-1 to 63-N illustrated in FIG. 18 are all 2×2 optical switches, it is also possible to configure an optical switch having two or more input/output ports by connecting the switch components illustrated in FIG. 18 to multi-stages of tree structures. This enables configuring an optical device as a wavelength selective optical switch having two or more input/output ports. Also, the number of input ports and the number of output ports may be either the same or different.

(g1) Description of Exemplary Modifications of the Sixth Embodiment

Figure 19:
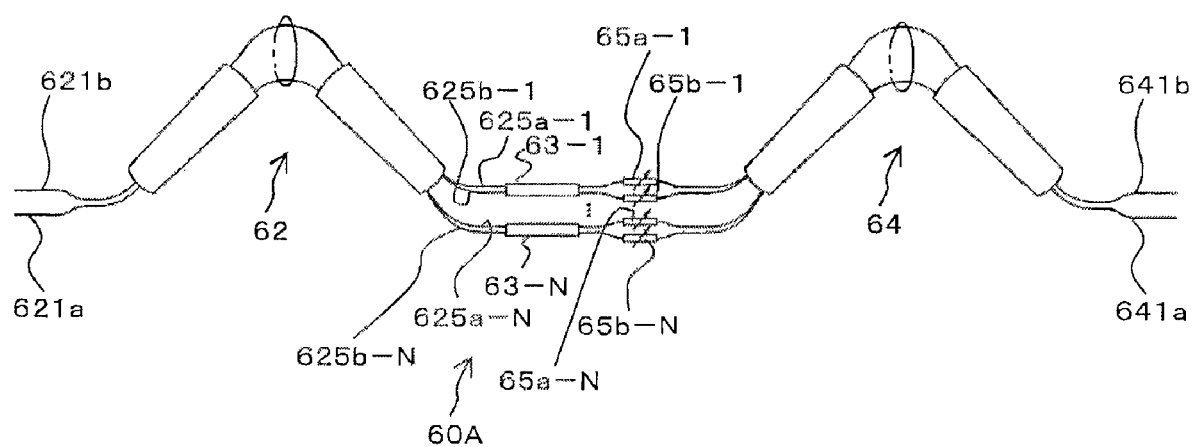
FIG. 19 is a schematic view illustrating the optical device according to an exemplary modification of the sixth embodiment of the present invention.
Figure 20:
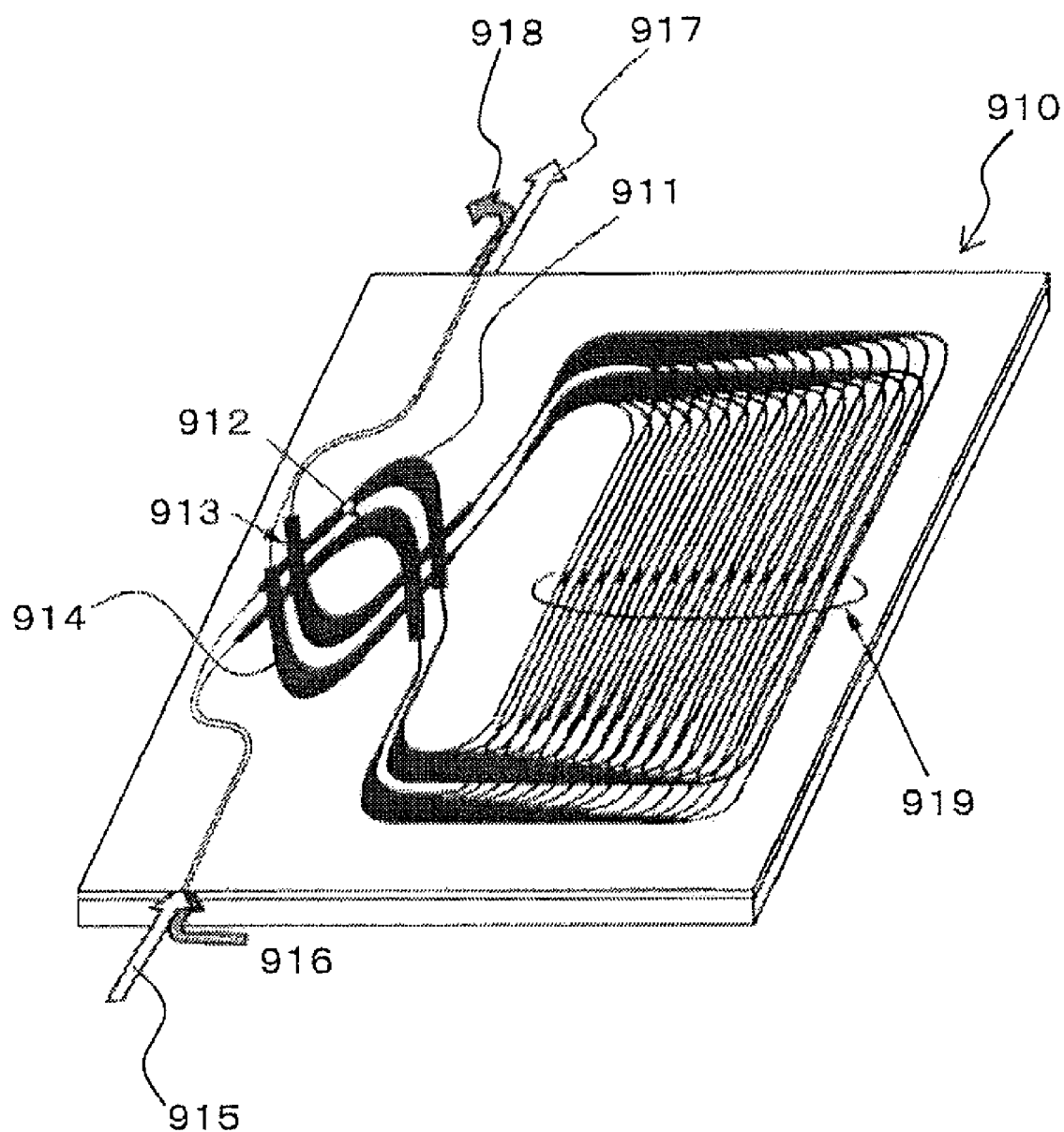
FIG. 20, FIG. 21, FIG. 22($a$) and FIG. 22($b$) are schematic views illustrating the prior art.
Figure 21:
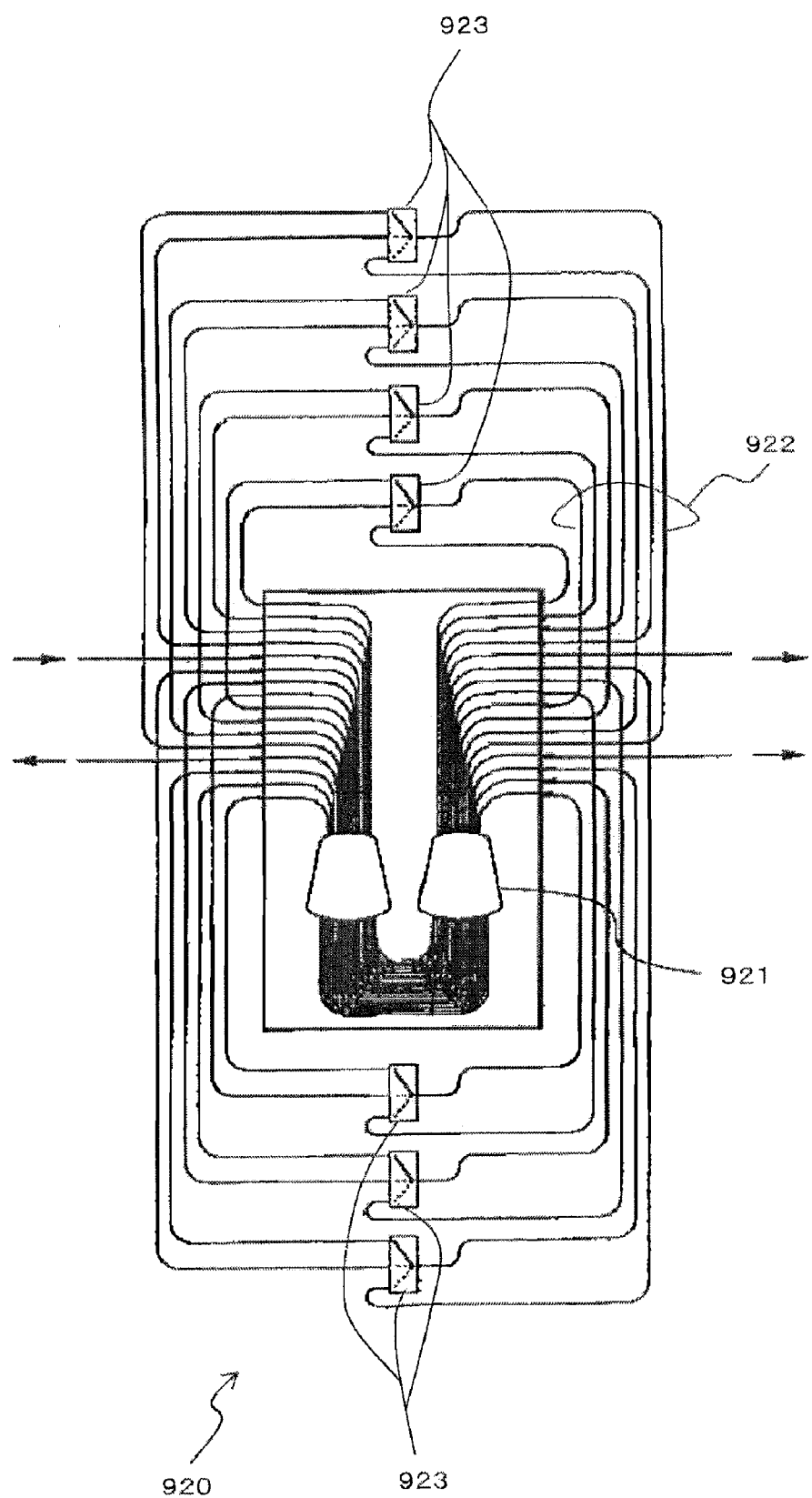
Figure 22A:
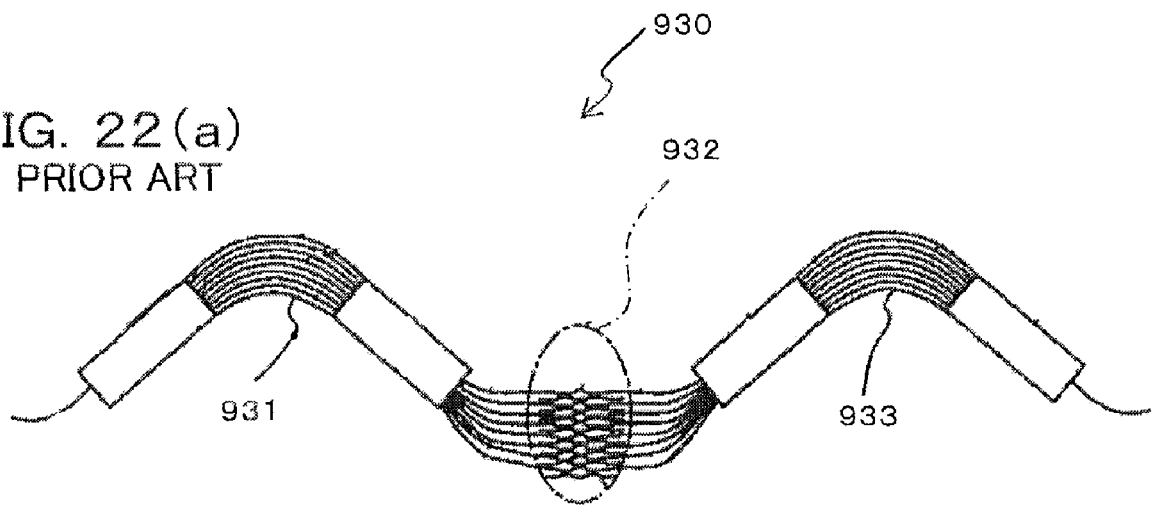
Figure 22B:
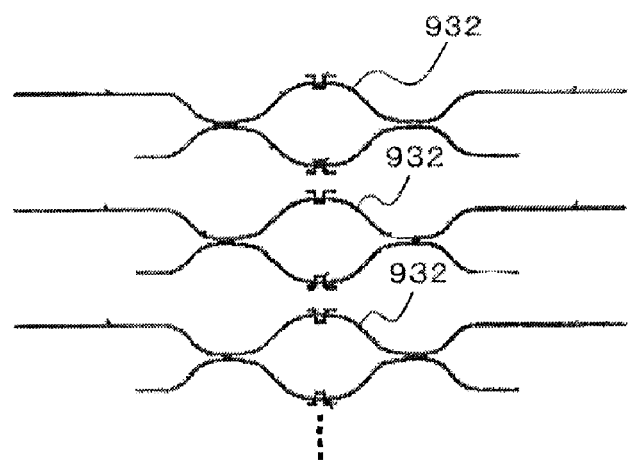

FIG. 19 is a schematic view illustrating an optical device 60A according to an exemplary modification of the sixth embodiment of the present invention. The optical device 60A illustrated in FIG. 19 is different from the aforementioned optical device 60 illustrated in FIG. 19 in that there are interposed variable optical attenuators (VOA) 65*a-i* 65*b-i* (i is an arbitrary number within the range of 1 to N) for variably controlling the intensity of propagating light, between the two output paths of the reflection-type optical switch 63-*i* and the input waveguides 645*a-i* 645*b-i* in the AWG 64. Further, in FIG. 19, the same reference characters as those in FIG. 18 designate similar components.

The VOAs 65*a-i* 65*b-i* may be constituted by MZIs for controlling the difference between the optical path lengths for light propagating through the branch waveguides by utilizing refractive index changes caused by heater heating, similarly to the aforementioned optical switches 63-*i* illustrated in FIG. 18, in principle.

With the optical device 60A configured as described above, there is provided an advantage that it is possible to realize a wavelength selective optical switch having the function of an AGEQ for adjusting and equalizing the light intensity levels of respective wavelengths while reducing the number of AWGs utilized as device components and significantly reducing the device size as compared with the prior art.

(h) Others

The present invention is not limited to the aforementioned embodiments and various modifications may be made without departing from the spirit of the present invention.

Further, the disclosure of the respective embodiments of the present invention will enable those skilled in the art to manufacture them.

As described above, the optical devices according to the present invention are advantageous in realizing WDM optical transmission system and are particularly suitable for use as wavelength selective optical switches for switching over the optical paths for respective wavelengths and optical level adjusting devices for equalizing the optical levels of respective wavelengths.

What is claimed is:

1. An optical device, comprising
M circulators, (M being a natural number);
a waveguide-type diffraction grating including M first input/output waveguides formed at its one end and N second input/output waveguides formed at the other end thereof, (N being a natural number) and respective paths from said M circulators being connected to said M first input/output waveguides; and
N light-intensity adjusting circuits capable of reflecting light from said N second input/output waveguides and adjusting the light intensity of the reflected light, respectively;
wherein said M circulators, said waveguide-type diffraction grating and said N light-intensity adjusting circuits are arranged in cascade
wherein each of said light-intensity adjusting circuits is constituted by a Mach-Zehnder interferometer constituted by a dividing waveguide for dividing or branching one of said N second input/output waveguides into two, two branch waveguides connected at their one ends to said two paths divided or branched by said dividing or branching waveguide and reflecting members formed at the other ends of the respective branch waveguides, and said reflecting members in said Mach-Zehnder interferometer are constituted by piston-operation-type mirrors capable of adjusting the respective optical path length difference between said reflecting members and said branch waveguide.

* * * * *

UNITED STATES PATENT AND TRADEMARK OFFICE
CERTIFICATE OF CORRECTION

| | | |
|---|---|---|
| PATENT NO. | : 7,428,355 B2 | Page 1 of 1 |
| APPLICATION NO. | : 11/752740 | |
| DATED | : September 23, 2008 | |
| INVENTOR(S) | : Koji Terada et al. | |

It is certified that error appears in the above-identified patent and that said Letters Patent is hereby corrected as shown below:

Title Page,

The following is added to the front page of the patent in the left column:

Related U.S. Application Data

(62) "Division of application No. 11/140,366 filed on May 27, 2005, now Pat. No. 7,239,770."

should be changed to:

Related U.S. Application Data

(62) "Division of application No. 11/140,366 filed on May 27, 2005, now Pat. No. 7,239,770 -- which is a CON of PCT/JP03/06062 filed on May 15, 2003. --"

Signed and Sealed this
Eleventh Day of September, 2012

David J. Kappos
*Director of the United States Patent and Trademark Office*